(12) United States Patent
Chauvin et al.

(10) Patent No.: US 12,471,027 B2
(45) Date of Patent: Nov. 11, 2025

(54) TECHNIQUES FOR MANAGING EXPOSURE USING UPLINK DUTY CYCLING

(71) Applicant: QUALCOMM Incorporated, San Diego, CA (US)

(72) Inventors: Michel Chauvin, San Diego, CA (US); Reza Shahidi, La Jolla, CA (US); Arnaud Meylan, San Diego, CA (US); Tienyow Liu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 721 days.

(21) Appl. No.: 17/720,145

(22) Filed: Apr. 13, 2022

(65) Prior Publication Data

US 2023/0016288 A1 Jan. 19, 2023

Related U.S. Application Data

(60) Provisional application No. 63/222,842, filed on Jul. 16, 2021.

(51) Int. Cl.
| | |
|---|---|
| *H04W 52/14* | (2009.01) |
| *H04B 1/3827* | (2015.01) |
| *H04W 28/02* | (2009.01) |
| *H04W 52/36* | (2009.01) |

(52) U.S. Cl.
CPC ........ *H04W 52/146* (2013.01); *H04B 1/3838* (2013.01); *H04W 28/0278* (2013.01); *H04W 52/367* (2013.01)

(58) Field of Classification Search
CPC ........... H04W 52/146; H04W 28/0278; H04W 52/367; H04W 52/281; H04W 52/242; H04W 52/343; H04B 1/3838
USPC .......................................... 455/522
See application file for complete search history.

(56) References Cited

U.S. PATENT DOCUMENTS

| | | | |
|---|---|---|---|
| 2006/0143444 A1* | 6/2006 | Malkamaki | H04W 28/06 713/160 |
| 2011/0296064 A1 | 12/2011 | Ehsan et al. | |
| 2018/0069438 A1* | 3/2018 | Bit-Babik | H02J 50/20 |
| 2020/0359330 A1 | 11/2020 | Zacharias et al. | |
| 2021/0345238 A1* | 11/2021 | Behnamfar | H04W 52/00 |
| 2022/0256473 A1* | 8/2022 | Kiilerich Pratas | H04W 52/367 |

OTHER PUBLICATIONS

International Search Report and Written Opinion—PCT/US2022/073082—ISA/EPO—Oct. 10, 2022.

* cited by examiner

*Primary Examiner* — Eugene Yun
(74) *Attorney, Agent, or Firm* — Holland & Hart LLP

(57) ABSTRACT

Methods, systems, and devices for wireless communications are described for radio frequency (RF) exposure limit compliance using uplink duty cycling. A user equipment (UE) may transmit a buffer status report (BSR) that indicates an amount of data that is to be transmitted by the UE, where lower priority data reported in the BSR may be throttled in order to reduce an amount of uplink resources associated with the lower priority data and thereby adjust an uplink duty cycle of the UE. The reduced uplink duty cycle may provide for additional transmit power that is available for higher priority data transmissions.

30 Claims, 14 Drawing Sheets

| | Buffer Status Report 215 |
| | UL Transmission 220 |
| | UL Grant(s) 225 |

TECHNIQUES FOR MANAGING EXPOSURE USING UPLINK DUTY CYCLING

CROSS REFERENCE

The present Application for Patent claims the benefit of U.S. Provisional Patent Application No. 63/222,842 by CHAUVIN et al., entitled "TECHNIQUES FOR MANAGING EXPOSURE USING UPLINK DUTY CYCLING," filed Jul. 16, 2021, which is assigned to the assignee hereof and is expressly incorporated by reference herein.

FIELD OF TECHNOLOGY

The following relates to wireless communications, including techniques for managing exposure using uplink duty cycling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communication devices (such as UEs) deployed in wireless communications systems are generally required to comply with radio frequency (RF) exposure limits set by domestic or international standards or regulations. In order to comply with such RF exposure limits, such devices may undergo a certification process prior to being shipped to market. Further, such wireless communication devices may employ techniques to enable the wireless communication device to assess RF exposure from the wireless communication device in real time and adjust transmission powers accordingly to comply with the RF exposure limits. Efficient techniques for such transmission power adjustments are thus desirable to provide compliance with RF exposure limits based on conditions at a wireless communication device.

SUMMARY

The described techniques relate to improved methods, systems, devices, and apparatuses that support techniques for managing exposure using uplink duty cycling. In accordance with various aspects, the described techniques provide for supporting data rates for relatively high priority data (e.g., Voice over Internet Protocol (VoIP) data) that is transmitted along with lower priority data (e.g., enhanced Mobile Broadband (eMBB) data or best-efforts data) in order to provide acceptable high priority data rates while maintaining compliance with RF exposure thresholds. In some cases, a user equipment (UE) may transmit a buffer status report (BSR) that indicates an amount of data that is to be transmitted by the UE. In some cases, the lower priority data reported in a BSR may be throttled in order to reduce an amount of uplink grants associated with the lower priority data, and thereby adjust an uplink duty cycle of the UE. The reduced uplink duty cycle may provide for additional transmit power that is available for higher priority data transmissions.

In some cases, the UE may determine whether to throttle an amount of lower priority data reported in a BSR based on a maximum permissible exposure (MPE) or a specific absorption rate (SAR) associated with a first time period and one or more second power levels of one or more second time periods in an exposure threshold compliance window. In some cases, if an amount of available power or energy for uplink transmissions from the UE during the first time period is not sufficient to transmit both the higher priority data and the lower priority data (e.g., based on an assumption that uplink grants will be provided for a certain portion of an upcoming time window), the amount of lower priority data reported in the BSR may be throttled such that expected uplink grants would maintain a target power or energy level.

A method for wireless communications at a user equipment (UE) is described. The method may include determining, based on a maximum permissible exposure (MPE) or a specific absorption rate (SAR) associated with a first time period and one or more second power levels of one or more second time periods in an exposure threshold compliance window, an amount of available power or energy for uplink transmissions from the UE during the first time period, identifying, based on the amount of available power or energy for uplink transmissions, an uplink data buffer size for a buffer status report, and transmitting the buffer status report to an access network entity.

An apparatus for wireless communications at a UE is described. The apparatus may include a processor, memory coupled with the processor, and instructions stored in the memory. The instructions may be executable by the processor to cause the apparatus to determine, based on a MPE or a SAR associated with a first time period and one or more second power levels of one or more second time periods in an exposure threshold compliance window, an amount of available power or energy for uplink transmissions from the UE during the first time period, identify, based on the amount of available power or energy for uplink transmissions, an uplink data buffer size for a buffer status report, and transmit the buffer status report to an access network entity.

Another apparatus for wireless communications at a UE is described. The apparatus may include means for determining, based on a MPE or a SAR associated with a first time period and one or more second power levels of one or more second time periods in an exposure threshold compliance window, an amount of available power or energy for uplink transmissions from the UE during the first time period, means for identifying, based on the amount of available power or energy for uplink transmissions, an uplink data buffer size for a buffer status report, and means for transmitting the buffer status report to an access network entity.

A non-transitory computer-readable medium storing code for wireless communications at a UE is described. The code may include instructions executable by a processor to determine, based on a MPE or a SAR associated with a first time period and one or more second power levels of one or more second time periods in an exposure threshold compliance window, an amount of available power or energy for uplink transmissions from the UE during the first time period, identify, based on the amount of available power or energy for uplink transmissions, an uplink data buffer size for a buffer status report, and transmit the buffer status report to an access network entity.

In some examples of the method, apparatuses, and non-transitory computer-readable medium described herein, the uplink data buffer size is a reduced buffer size relative to an unadjusted buffer size at the UE, and where the reduced buffer size adjusts an uplink duty cycle of the UE by throttling an amount of uplink grants received from the access network entity. In some examples of the method, apparatuses, and non-transitory computer-readable medium described herein, the identifying the uplink data buffer size adjusts an amount of relatively low priority data that is reported to allow higher priority data traffic to be transmitted at higher power, with less fragmentation, with a higher success rate, with fewer retransmissions relative to the unadjusted buffer size, or any combinations thereof. In some examples of the method, apparatuses, and non-transitory computer-readable medium described herein, the identifying may include operations, features, means, or instructions for identifying a target power or energy for the first time period and adjusting the uplink data buffer size based on the target power or energy and the amount of available power or energy for the first time period, and where a reduced uplink data buffer size drives the amount of available power or energy for the first time period and the one or more second time periods towards the target power or energy.

In some examples of the method, apparatuses, and non-transitory computer-readable medium described herein, an amount of power or energy that can be used in the first time period is determined based on an amount of power or energy based on available energy for the first time period, a reserve energy level, an amount of energy previously used in the exposure threshold compliance window that becomes available for the one or more second time periods, a target power for uplink transmissions from the UE, a prior target power determined prior to the first time period, or any combinations thereof. In some examples of the method, apparatuses, and non-transitory computer-readable medium described herein, the amount of power or energy that can be used in the first time period is determined to be zero when an energy associated with the target power exceeds a sum of the available energy for the first time period, the reserve energy level, and the amount of energy that becomes available for the one or more second time periods.

In some examples of the method, apparatuses, and non-transitory computer-readable medium described herein, the identifying may include operations, features, means, or instructions for determining a number of throttleable lower priority bytes associated with the first time period based on the amount of power or energy that can be used in the first time period, and where the uplink data buffer size is based on the number of throttleable lower priority bytes. In some examples of the method, apparatuses, and non-transitory computer-readable medium described herein, the number of throttleable lower priority bytes is determined based on a first portion of the amount of energy that can be used in the first time period that remains after reserving a second portion of the amount of energy for higher priority traffic. In some examples of the method, apparatuses, and non-transitory computer-readable medium described herein, the number of throttleable lower priority bytes is determined based on a difference between a total number of available bytes that can be transmitted in the first time period and a number of higher priority bytes for higher priority traffic. In some examples of the method, apparatuses, and non-transitory computer-readable medium described herein, the uplink data buffer size includes an amount of bytes for higher priority traffic and the determined number of throttleable lower priority bytes.

Some examples of the method, apparatuses, and non-transitory computer-readable medium described herein may further include operations, features, means, or instructions for determining an amount of power or energy that can be used in the first time period based on a maximum transmit power or energy for the first time period, a reserved power or energy level, an amount of energy previously used in the exposure threshold compliance window that becomes available for the one or more second time periods, a target power for uplink transmissions from the UE, a prior target power determined prior to the first time period, or any combinations thereof In some examples of the method, apparatuses, and non-transitory computer-readable medium described herein, the uplink data buffer size includes a best effort buffer size that is adjusted based on a number of throttleable lower priority bytes associated with the first time period, and a voice over Internet protocol (VOIP) buffer size that is an unadjusted value of a VOIP buffer at the UE.

In some examples of the method, apparatuses, and non-transitory computer-readable medium described herein, the uplink data buffer size is adjusted based on a target power or energy for the first time period, and where the target power is updated by the UE for the one or more second time periods in the exposure threshold compliance window. In some examples of the method, apparatuses, and non-transitory computer-readable medium described herein, the target power or energy may be updated based on a link budget model or power control equation associated with the first time period. In some examples of the method, apparatuses, and non-transitory computer-readable medium described herein, the link budget model may be a function of one or more of a path loss, a target signal to noise ratio (SNR), a target number of resource blocks (RBs) to be transmitted, an estimated receiver noise, a target block error rate (BLER), an actual BLER of uplink transmissions from the UE over a predetermined time period, a ratio of successful to unsuccessful transmissions from the UE to the access network entity over the predetermined time period, a thermal noise associated with a channel between the UE and the access network entity, a subcarrier spacing for communications between the UE and the access network entity, or any combinations thereof. In some examples of the method, apparatuses, and non-transitory computer-readable medium described herein, the power control equation may be a function of a requested shared channel transmission power provided at an initial time period of the exposure threshold compliance window, and a maximum transmit power level.

Some examples of the method, apparatuses, and non-transitory computer-readable medium described herein may further include operations, features, means, or instructions for selecting at least a first link from two or more communication links that is established in a dual-connectivity configuration, the first link selected based on a presence of higher priority traffic at the first link, determining a target power level to be maintained at each selected link, and where the uplink data buffer size is identified for each selected link based on the amount of available power or energy for uplink transmissions during the first time period.

Some examples of the method, apparatuses, and non-transitory computer-readable medium described herein may further include operations, features, means, or instructions for identifying a first portion of an amount of energy that can be used in the first time period that remains after reserving a second portion of the amount of energy for higher priority traffic and splitting the first portion of the amount of energy to a first amount of energy for transmitting in the first time period on a first link established in a dual-connectivity configuration and a second amount of energy for transmitting in the first time period on a second link established in the dual-connectivity configuration. In some examples of the method, apparatuses, and non-transitory computer-readable medium described herein, the splitting the first portion of the amount of energy to the first amount of energy and the second amount of energy may include operations, features, means, or instructions for splitting the first portion of the amount of energy to the first amount of energy and the second amount of energy based at least in part on one or more metrics or equations that represent a channel or link performance of the first link, the second link, or both.

In some examples of the method, apparatuses, and non-transitory computer-readable medium described herein, the one or more metrics or equations that represent the channel or link performance of the first link, the second link, or both are based at least in part on a path loss, energy-per-byte statistic, throughput, a link budget model, or a combination thereof of the first link, the second link, or both. Some examples of the method, apparatuses, and non-transitory computer-readable medium described herein may further include operations, features, means, or instructions for determining a first number of throttleable lower priority bytes associated with the first time period based at least in part on the first amount of energy and determining a second number of throttleable lower priority bytes associated with the first time period based at least in part on the second amount of energy, wherein the uplink data buffer size is based at least in part on the first number of throttleable lower priority bytes and the second number of throttleable lower priority bytes. In some examples of the method, apparatuses, and non-transitory computer-readable medium described herein, a total of the first number of throttleable lower priority bytes and the second number of throttleable lower priority bytes is determined based at least in part on a difference between a total number of available bytes that can be transmitted in the first time period and a number of higher priority bytes for higher priority traffic.

DETAILED DESCRIPTION

Figure 1:
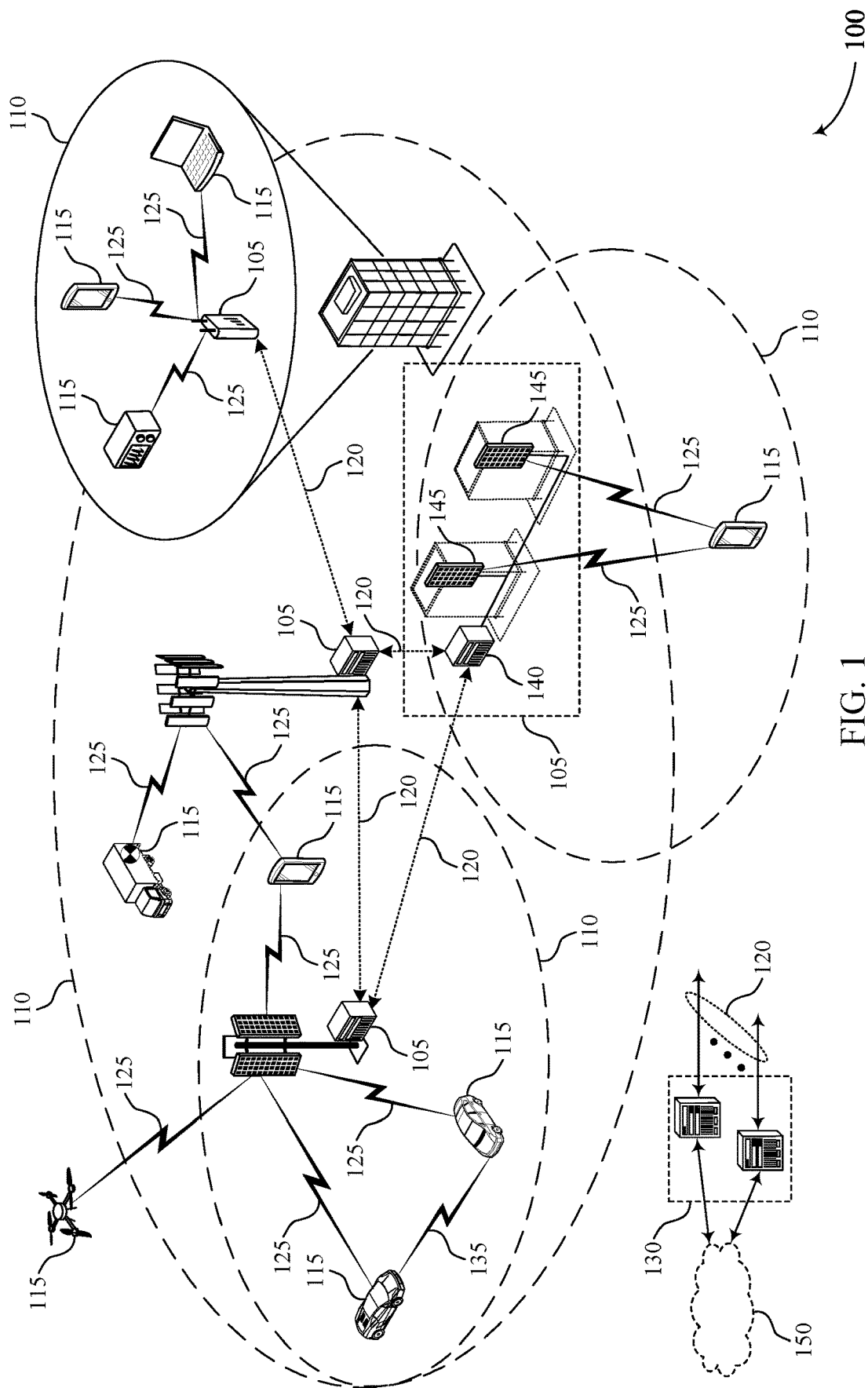
FIG. 1 illustrates an example of a wireless communications system that supports techniques for managing exposure using uplink duty cycling in accordance with aspects of the present disclosure.

Aspects of the present disclosure provide techniques for radio frequency (RF) exposure compliance based on a buffer status for higher priority data and lower priority data at a transmitting device (e.g., a user equipment (UE)). RF exposure limits may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of $mW/cm^2$. In certain cases, a maximum permissible exposure (MPE) limit in terms of PD may be present for wireless communication devices using transmission frequencies above 6 GHz (e.g., for millimeter wave (mmW) transmissions). The MPE limit is a regulatory metric for exposure based on area, such as an energy density limit defined as a number (X) watts per square meter ($W/m^2$) averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11ac, Bluetooth, etc. PD may be used to assess RF exposure for transmission frequencies higher than 6 GHz, which cover wireless communication technologies such as IEEE 802.11ad, 802.11ay, 5G in mmW bands, etc. Thus, different metrics may be used to assess RF exposure for different wireless communication technologies.

In some cases, a UE may perform power control procedures for compliance with RF exposure limitations such as SAR and MPE. In some cases, the UE may perform time averaging of transmit powers across a moving time window to provide overall RF emissions that are within RF exposure limits for the time window. In some examples, a UE may run what may be referred to as an outer loop power control procedure in which RF emissions over an averaging window (e.g., a 100 second sliding window) may be time averaged, and a power limit for a current time window (e.g., a 500 ms window) may be provided. An inner loop power control procedure may then determine power levels for uplink transmissions within the current time window.

In some cases, the power control procedure may provide an indication of a maximum power ($P_{max}$) for the current time window (e.g., a 500 ms time window), which indicates the average maximum power available for transmissions during the current time window. In some cases, the provided $P_{max}$ may be scaled based on a configuration that is provided to the UE (e.g., a radio resource control (RRC) configuration), that indicates a portion of the time window during which downlink communications may be transmitted and a portion of the time window during which uplink communications may be transmitted (e.g., based on a configured time division duplexing (TDD) format). Based on such a configuration, the UE may scale the value of $P_{max}$ to account for the portion of the time window that is configured for uplink communications.

Various aspects of the present disclosure provide techniques for supporting data rates for relatively high priority data (e.g., Voice over Internet Protocol (VoIP) data) that is transmitted along with lower priority data (e.g., enhanced Mobile Broadband (eMBB) data or best-efforts data) in order to provide high priority data rates that maintain target values for reliability (e.g., to prevent dropped calls when the high priority data includes VoIP data) while maintaining compliance with RF exposure thresholds (e.g., SAR/MPE thresholds). In some cases, uplink duty cycling may be implemented to throttle an amount of lower priority data that is transmitted and allow for higher priority data to be transmitted at a target power level. In some cases, a UE may transmit a buffer status report (BSR) that indicates an amount of data that is to be transmitted by the UE. In some cases, the lower priority data reported in the BSR may be throttled in order to reduce an amount of uplink grants associated with the lower priority data, and thereby adjust an uplink duty cycle of the UE. The reduced uplink duty cycle may provide for additional transmit power that is available for higher priority data transmissions. In some examples, an uplink duty cycle may correspond to a fraction of time that one or more resources may be used for uplink transmissions, an amount of uplink data transmitted on one or more resources, or both.

In some cases, the UE may determine whether to throttle an amount of lower priority data reported in a BSR based on MPE/SAR associated with a first time period and one or more second power levels of one or more second time periods in an exposure threshold compliance window. In some cases, if an amount of available power or energy for uplink transmissions from the UE during the first time period is not sufficient to transmit both the higher priority data and the lower priority data (e.g., based on $P_{max}$ for the time window), the amount of lower priority data reported in the BSR may be throttled such that expected uplink grants would allow the UE to maintain a target transmission power or energy level on the uplink. It is noted that, while various examples discussed herein are provided for 5G communications (e.g., wireless wide area network (WWAN) communications), the scope of the present disclosure and techniques discussed herein apply to any wireless communications or radio access technology (RAT) or combinations thereof (e.g., 2G/3G, 4G, 5G (e.g., sub-6 GHz or mmW bands), IEEE 802.11 or WiFi, Bluetooth, Zigbee, personal area network (PAN), ultra-wide band (UWB) networks, etc.).

The techniques discussed herein may allow for enhanced reliability for communications while maintaining compliance with exposure thresholds. For example, a UE near a cell edge may initiate a relatively high priority service (e.g., a VoIP call) and a SAR/MPE power back-off may have a devastating effect on such services, which may require payload to be transmitted successfully to the base station with low latency/low jitter, without fragmentation and few or no retransmissions. By using uplink duty cycling techniques as discussed herein, higher priority transmissions at a target power value may be maintained through throttling lower priority traffic (e.g., best effort data traffic). Further, such techniques may provide efficient mechanisms for a UE to comply with one or more RF exposure limitations while maintaining reliability targets for higher priority data. Thus, latency, bandwidth, and network efficiency may be enhanced, providing reduced power consumption (e.g., through fewer retransmissions, higher coding rates, etc.) and improved user experience.

Aspects of the disclosure are initially described in the context of wireless communications systems. Aspects of the disclosure are further illustrated by and described with reference to apparatus diagrams, target power levels, system diagrams, and flowcharts that relate to techniques for managing exposure using uplink duty cycling.

FIG. 1 illustrates an example of a wireless communications system 100 that supports techniques for managing exposure using uplink duty cycling in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, one or more of the UEs 115 may support techniques for uplink duty cycling to control transmission power for RF exposure compliance. In some cases, UEs 115 may use such duty cycling to support data rates and reliability for relatively high priority data (e.g., VoIP data) that is transmitted along with lower priority data (e.g., eMBB data or best-efforts data) in order to provide acceptable high priority data rates while maintaining compliance with RF exposure thresholds. In some cases, a UE 115 may transmit a BSR that indicates an amount of data that is to be transmitted by the UE 115. In some cases, the lower priority data reported in a BSR may be throttled in order to reduce an amount of uplink grants associated with the lower priority data, and thereby adjust an uplink duty cycle of the UE 115. The reduced uplink duty cycle may provide for additional transmit power that is available for higher priority data transmissions.

In some cases, the UE 115 may determine whether to throttle an amount of lower priority data reported in a BSR based on an MPE or a SAR associated with a first time period and one or more second power levels of one or more second time periods in an exposure threshold compliance window. In some cases, if an amount of available power or energy for uplink transmissions from the UE 115 during the first time period is not sufficient to transmit both the higher priority data and the lower priority data (e.g., based on a Pmax provided for an upcoming time window), the amount of lower priority data reported in the BSR may be throttled such that the expected uplink grants would allow the UE to maintain a target transmission power or energy level sufficient to support the higher priority transmissions.

Figure 2:
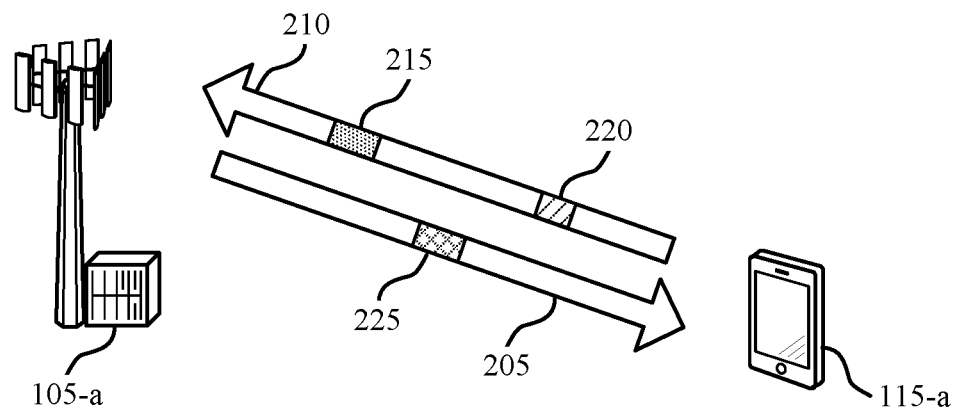
FIG. 2 illustrates an example of a wireless communications system that supports techniques for managing exposure using uplink duty cycling in accordance with aspects of the present disclosure.

FIG. 2 illustrates an example of a wireless communications system 200 that supports techniques for managing exposure using uplink duty cycling in accordance with aspects of the present disclosure. Wireless communications system 200 may include a UE 115-*a* and a base station 105-*a*, which may be examples of the corresponding devices described with reference to FIG. 1.

The UE 115-*a* may communicate with the base station 105-*a* using a downlink communication link 205 (or multiple links), and an uplink communication link 210 (or multiple links). In some cases, the base station 105-*a* may provide uplink configuration information to the UE 115-*a*. The uplink configuration information may include, for example, an uplink and downlink configuration (e.g., a TDD configuration) for communications that indicates resources for uplink and downlink communications. In some cases, the UE 115-*a* may be allocated with resources for uplink communications and may determine an uplink transmit power in accordance with techniques discussed herein.

In some cases, two or more downlink communication links 205 or uplink communication links 210, or combinations thereof, may be established according to dual-connectivity (DC) techniques in which multiple concurrent links are established. For example, EN-DC may be implemented in which an LTE network provides a master cell group (MCG), and an NR network provides a secondary cell group (SCG). NR-DC may be implemented in which NR provides the MCG and SCG (e.g., the MCG may use NR frequency range 1 (FR1) and the SCG may use NR frequency range 2 (FR2), or the MCG may use NR FR2 and the SCG may use NR FR1), or NE-DC may be implemented in which an NR network provides the MCG and an LTE network provides the SCG (e.g., the MCG may use NR FR1 or NR FR2, and the SCG may use LTE).

In some cases, the UE 115-*a* may perform one or more power control procedures that provide indications of transmit powers that comply with RF exposure limits. For example, an outer loop power control procedure may provide a power limit for a current power control time window (e.g., a 500 ms window), and an inner loop power control procedure may then determine power levels for uplink transmissions within the power control time window. Based on an available transmission power, the UE 115-*a* may determine an amount of data that can be transmitted (e.g., based on an estimated uplink duty cycle and grants for a time period). In some cases, the uplink duty cycle may be adjusted to reduce a number of uplink transmissions and provide the UE 115-*a* the ability to use a higher transmit power and maintain compliance with RF exposure limits. In some cases, the uplink duty cycle may be adjusted by the UE 115-*a* by throttling an amount of data that is reported in a BSR 215, as will be discussed in more detail with reference to various examples of FIGS. 3 through 6. Based on the BSR 215, the base station 105-*a* may provide the UE 115-*a* with one or more uplink grants 225 which may be used by the UE 115-*a* for uplink transmissions 220. In some cases, based on the throttled amount of data reported in the BSR 215, a transmit power of the uplink transmissions 220 may be adjusted towards a target transmission power.

The techniques described herein allow a power control algorithm at the UE 115-*a* to control its SAR/MPE power limit, and may thereby improve the quality of services that are of higher importance to users, such as VoIP, video, other high priority traffic, or any combinations thereof. Techniques as discussed herein may reduce a number of call drops, delays and poor quality of service through boosting the SAR/MPE power limit up to the target power and maintaining the target power at a higher value than implementations that do not throttle BSR reporting of lower priority data. Further, described techniques may boost power levels relatively quickly upon determination that higher priority traffic is to be transmitted. Additionally, through prioritization of VoIP and high priority traffic, energy may be reserved to enhance the likelihood of successful transmission and reception of the VoIP and high priority packets. Through the use of a higher power limit, the UE 115-*a* can increase the chances of being granted larger transport blocks (TBs) thus reducing the VoIP and high priority traffic packet fragmentation and latency/jitter. Moreover, the described techniques may self-correct continuously based on continuously monitoring the SAR/MPE energy available and power limit as well as the actual energy used to transmit information to the base station 105-a.

Figure 3:
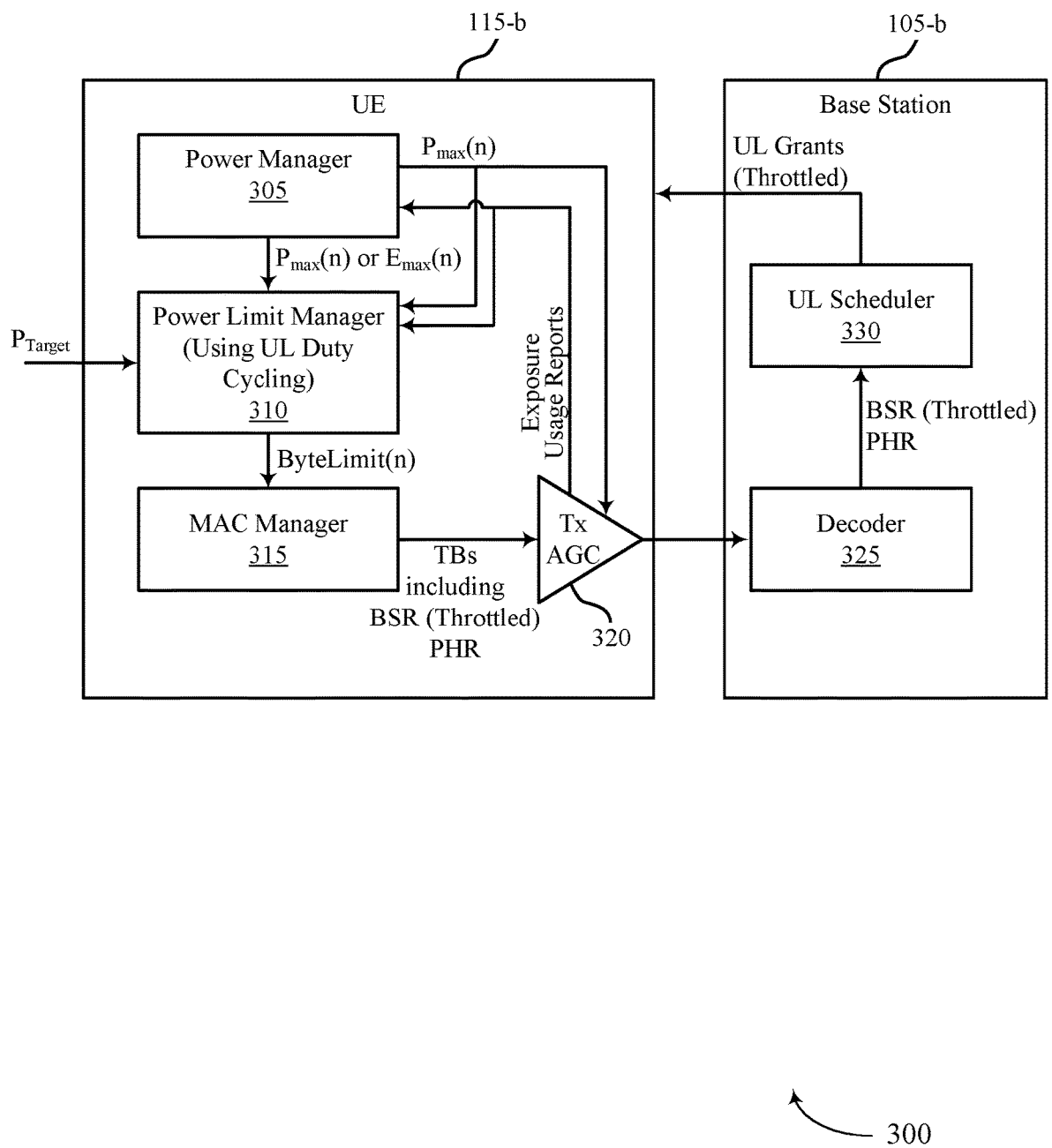
FIG. 3 illustrates a block diagram of a UE and base station that supports techniques for managing exposure using uplink duty cycling in accordance with aspects of the present disclosure.

FIG. 3 illustrates a block diagram 300 of a UE 115-*b* and a base station 105-*b* that supports techniques for managing exposure using uplink duty cycling in accordance with aspects of the present disclosure. The UE 115-*b* and base station 105-*b* may be examples of the corresponding devices as discussed with reference to FIGS. 1 and 2. In this example, UE 115-*b* may include a power manager 305 that may perform RF exposure monitoring and control (e.g., based on inner loop and outer loop power control procedures) based on exposure usage reports provided by an RF front end that may include a transmit automatic gain control (AGC) 320 component. The power manager 305 may provide information related to a maximum power or energy for a time period, such as a maximum power value ($P_{max}$) or a maximum energy value ($E_{urax}$) for a time period (n).

In this example, a power limit manager 310 may use uplink duty cycling to provide for reliable higher priority communications in accordance with various aspects of the disclosure. The power limit manager 310 may receive a target power ($P_{Target}$) or a target energy ($E_{Target}$), which may be used along with $P_{max}$ or $E_{max}$ and exposure usage reports to determine a byte limit for the time period (n). The byte limit may be provided to a MAC manager 315, which may format a BSR for transmission to the base station 105-*b*. The base station 105-*b* may decode the BSR at decoder 325 and may provide a reported BSR (which may be throttled) and power headroom (PHR) to an uplink scheduler 330. Based on the BSR and the PHR, the uplink scheduler 330 may generate one or more uplink grants for the UE 115-*b*.

In accordance with some aspects, the power limit manager 310 may use a power control algorithm that controls the UE 115-*b* uplink duty cycle, via the BSR, in order to control the SAR/MPE power limit (e.g., $P_{max}(n)$). The power control algorithm may boost the SAR/MPE power limit ($P_{max}$) to the target power level (e.g., $P_{Target}$), and then maintain the $P_{max}$ at the target power level. In some cases, the power control algorithm achieves its goal by varying the uplink duty cycle using the BSR. The uplink duty cycle may be varied by calculating the amount of energy that is allowed to be spent (e.g., $E_{Allowed}(n)$) in the current SAR/MPE interval, while achieving the goal of boosting the SAR/MPE Pmax to PTarget or maintaining the $P_{max}$ at $P_{Target}$. Examples of the power control algorithm are described with reference to FIG. 5.

In accordance with some further aspects, the power limit manager 310 may use a power control algorithm to control an uplink duty cycle on one or multiple links when the UE 115-*b* is connected in a dual-connectivity configuration with one or multiple base stations 105-*b* (e.g., when the UE 115-*b* has an EN-DC, NR-DC, or NE-DC configuration). In some cases, when the UE 115-*b* is configured for DC, and the UE 115-*b* wants to maintain a power limit (e.g., $P_{max,k}(n)$ for a link k) at a target power (e.g., $P_{target,k}(n)$), the power limit manager 310 may determine on which links a target power is to be maintained, and for each selected link that the power limit manager 310 wants to maintain the target power, the power limit manager 310 may determine the target power level ($P_{target,k}(n)$) to maintain. The power limit manager 310 may then control the uplink duty cycle of the selected link(s) using the BSR to maintain the power limit ($P_{max,k}(n)$) of the link(s) at the selected target power level ($P_{target,k}(n)$).

In some examples, the power manager 305, the power limit manager 310, and the MAC manager 315, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the power manager 305, the power limit manager 310, and the MAC manager 315, or various combinations or components thereof may be implemented in code (e.g., as communications management software or firmware) executed by a processor. If implemented in code executed by a processor, the functions of the power manager 305, the power limit manager 310, and the MAC manager 315, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

Figure 4:
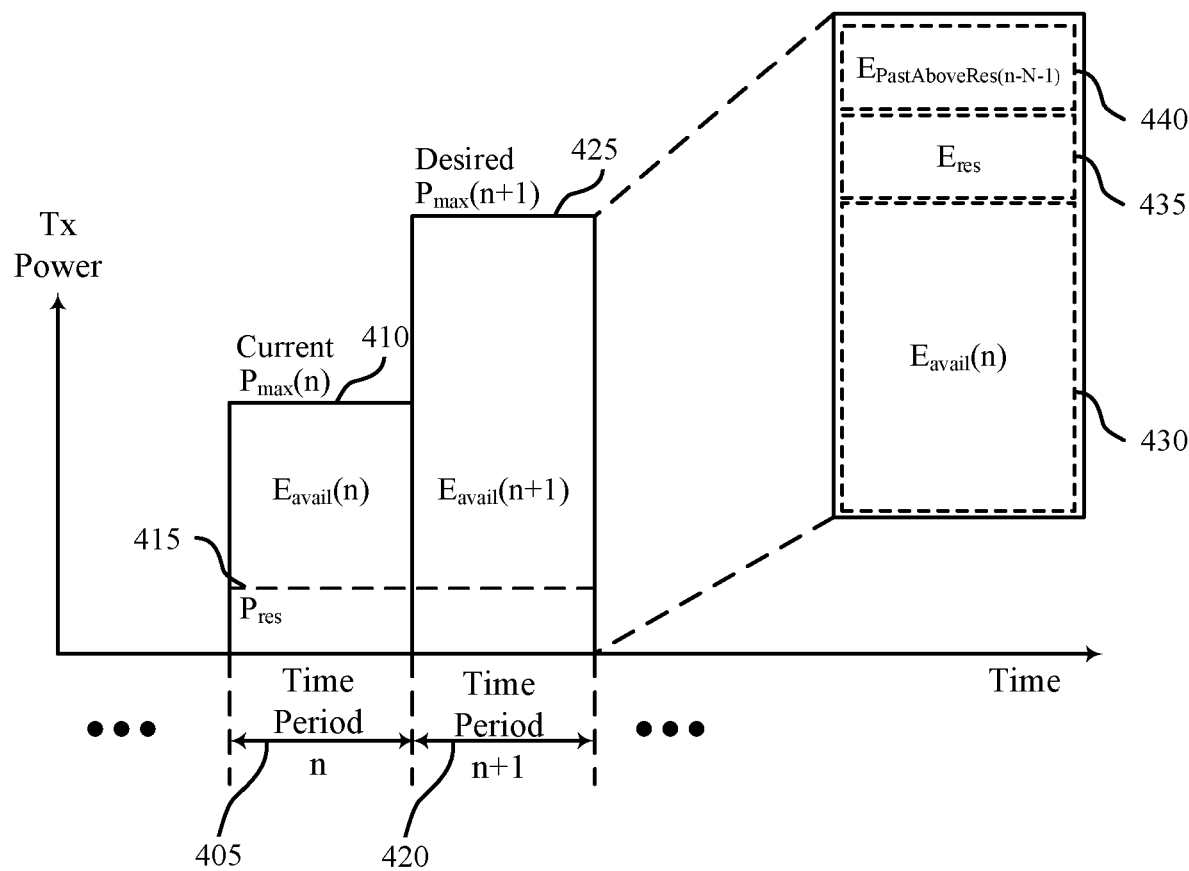
FIG. 4 illustrates an example of a current and target transmit powers that support techniques for managing exposure using uplink duty cycling in accordance with aspects of the present disclosure.

FIG. 4 illustrates an example of current and target transmit powers 400 that supports techniques for managing exposure using uplink duty cycling in accordance with aspects of the present disclosure. The example of current and target transmit powers 400 may be implemented by a UE (e.g., a UE 115) such as discussed with reference to FIGS. 1-3, or another wireless device that operates in accordance with one or more RF exposure limits (e.g., SAR/MPE limits).

In this example, a first time period 405 (time period n) may have a current maximum transmit power 410 ($P_{max}(n)$). The current maximum transmit power 410 may be provided by a power management manager (e.g., power manager 305 of UE 115-b in FIG. 3), which may be above a reserve power 415 ($P_{res}$) but less than a maximum transmit power (e.g., $P_{c,max}$) that may be transmitted by the UE. The first time period 405, based on a duration of the time period and $P_{max}(n)$, may have an available energy 430 of $E_{avail}(n)$. A second time period 420 (time period n+1) may have a desired maximum transmit power 425 ($P_{max}(n+1)$). The second time period 420, based on a duration of the time period and $P_{max}(n+1)$, may have an available energy of $E_{avail}(n+1)$. The desired maximum transmit power 425 (e.g., $P_{target}$) may correspond to a power that may provide for reliable communications of higher priority services (e.g., VoIP calls). In some cases, the power control algorithm may be derived such that the available energy for the second time period 420 (e.g., $E_{avail}(n+1)$) may be based on the available energy of the first time period (e.g., $E_{avail}(n)$), the reserve energy 435 that will be available to the UE in the second time period 420 (e.g., $E_{res}(n)$), the energy 440 used in a past interval (e.g., interval n−N−1, where N is the number of intervals in the SAR/MPE compliance interval) that will become available to the UE in the second time period 420, and an amount of energy that can be used in the first time period 405.

The available energy in a time period (e.g., $E_{avail}(n)$) may be derived from converting a power associated with an MPE or SAR of the time period to energy. $E_{avail}(n)$ may be based on an energy or power provided by a SAR or MPE compliance entity. For instance, $E_{avail}(n)$ may be the energy or power that the SAR or MPE compliance entity assigns to a radio based on a number of different factors, such as the amount of SAR or MPE energy remaining in the SAR or MPE compliance window, the amount of high priority energy reserved by each radio, the priority of the radio compared to other radios, the minimum and maximum reservation limits, a number of compliance entity configuration settings which determine how to distribute the remaining energy after reserving high priority energy and then finally the remaining energy the SAR or MPE compliance entity decides to distribute to the radio.

In some cases, the power control algorithm may identify an estimate of the amount of power that the UE can use in the current SAR/MPE interval in the power domain. For the power domain, the UE may determine an amount of power (e.g., in mW) that the UE can use in the current SAR/MPE interval (e.g., $P_{use}(n)$ for first time period 405), which will maintain the SAR/MPE power limit at the desired maximum transmit power 425 ($P_{Target}$) or boost the UE's SAR/MPE power limit to the desired maximum transmit power 425 in a future SAR/MPE interval. In cases where the desired maximum transmit power 425 is greater than an available amount of power for the first time period 405 plus any energy that will become available in the second time period, then the amount of power for the first time period 405 may be set to zero, which provides additional power to be available in a subsequent time period (e.g., second time period 420), and thus drives the amount of available power in subsequent time periods toward the desired maximum transmit power 425.

In some examples, the power control algorithm may then provide that the UE calculates the total number of best effort bytes (e.g., "throttleable low priority bytes") that can be transmitted in the upcoming SAR/MPE interval according to one of multiple available techniques. In some cases, the total number of best effort bytes may be determined based on reserving energy for VoIP, signaling, and other high priority traffic, by subtracting an estimate of the total energy required to transmit VoIP, signaling and other high priority traffic in the upcoming interval, and then converting the remaining energy into allowed bytes ($B_0(n)$) based on an average energy per byte ($E_{B,Avg}$) and a margin to maintain compliance with RF exposure thresholds) for best effort traffic. In some cases, the total energy to transmit the higher priority traffic (e.g., VoIP, signaling, and other high priority traffic) may exceed available amount of energy for the first time period 405, and the energy for the best effort bytes may be zero. In cases where the energy for the best effort bytes is non-zero, the number of best effort bytes may be determined by dividing the available energy by the average energy per byte, and scaling the result based on the margin to maintain compliance with RF exposure thresholds. In other examples, the total number of best effort bytes may be determined based on converting the energy into total bytes ($B_{Tot}$) and then reserving energy for VoIP, signaling and other high priority traffic by subtracting an estimate of the expected number of VoIP, signaling and other high priority traffic bytes ($B_{VoIP,Expected}$) in the upcoming interval.

The total number of best effort bytes may then be reported in a BSR by the UE. For example, the UE may under-report the BSR (e.g., BSR throttling) by accounting for the energy used by subtracting the grants/bytes transmitted since the last SAR/MPE update from the adjusted buffer size ($B_t$). The BSR reporting may then include, for example, a best effort BSR where the BSR for best effort/throttleable data is limited by the adjusted buffer size ($B_t$). If high priority traffic is reported using the same BSR as the best effort traffic (e.g., they belong to a same LCG), then high priority traffic is not limited. Thus, when the adjusted buffer size ($B_t$) reaches zero bytes and there is no high priority traffic to report, the UE will send an adjusted padding BSR ($BSR_0$) to indicate to the base station that the UE no longer has SAR/MPE energy remaining to transmit best effort data. If a separate VoIP BSR is provided the VoIP BSR is not limited (e.g., $BSR_{VoIP}(t) = Buf_{VoIP}(t)$).

In some aspects, if a UE is operating in a dual-connectivity mode, the UE may communicate with cells in multiple cell groups, and the UE may independently report (e.g., under-report) the buffer status of low priority data based on an amount of low priority energy that each cell group is granted. That is, instead of dividing low priority energy or power equally across two cell groups, the UE may steer energy or power to maximize total uplink throughput of the UE when operating in the dual-connectivity mode, and a best effort bearer may be split across cell groups. In an example, when the UE is operating in a dual-connectivity mode, a best effort bearer is a split bearer, and the UE is instructed to use an energy steering mode, the UE may split energy for low priority traffic across cell groups in such a way as to maximize total UE uplink throughput.

As described, the UE may determine the low priority energy to split between cell groups based on an available amount of energy and reserving energy for VoIP, signaling, and other high priority traffic. For instance, the UE may determine the low priority energy to split between cell groups by subtracting an estimate of the total energy required to transmit VoIP, signaling and other high priority traffic from an available amount of energy. The splitting or steering of energy for low priority traffic may be based on metrics or equations that represent channel or link performance. For example, a UE may use a path loss estimation, an energy-per-byte statistic, throughput, a link budget model for each link, or a combination thereof, to determine how to split low priority energy to maximize total uplink throughput.

Once the UE has split and granted the energy to each cell group, the BSR throttling feature may take care of determining the number of low priority data bytes that the UE is allowed to transmit on each cell group. The UE may request in the BSR, for each cell group, the amount of low priority bytes that the UE is allowed to transmit, and the request in the BSR may influence a number of granted bytes that the UE receives per cell group. So, by steering the low priority energy in such a way to maximize throughput, the UE is able to steer the number of grants or bytes it receives for a cell group in such a way to maximize total cell throughput. Throughput maximization may be one metric that the UE can optimize using the described techniques. Energy steering may also be used to optimize other metrics.

Figure 5:
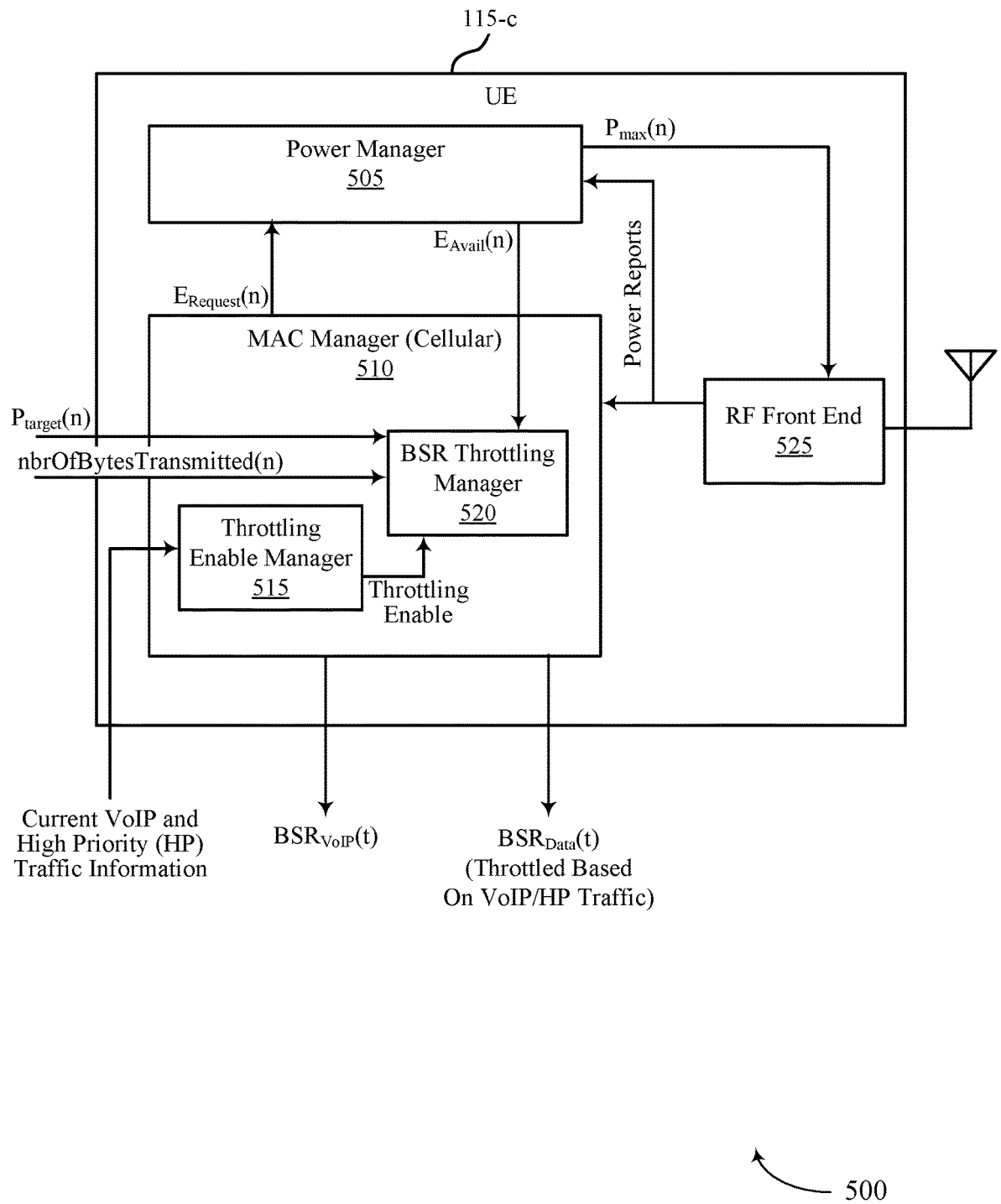
FIG. 5 illustrates a block diagram of a UE that supports techniques for managing exposure using uplink duty cycling in accordance with aspects of the present disclosure.

FIG. 5 illustrates another example of a block diagram 500 of a UE 115-c that supports techniques for managing exposure using uplink duty cycling in accordance with aspects of the present disclosure. The UE 115-c may be an example of the corresponding devices as discussed with reference to FIGS. 1-4. In this example, UE 115-c may include a power manager 505 that may perform RF exposure monitoring and control (e.g., based on inner loop and outer loop power control procedures) based on exposure usage reports provided by an RF front end 525 (e.g., that may include an access control gateway (ACG) component). The power manager 505 may provide information related to a maximum power or energy for a time period, such as a maximum power value ($P_{max}$) or a maximum energy value ($E_{max}$) for a time period (n), and an available energy power ($E_{Avail}$). RF front end 525 may support dual-connectivity, in which one or more dual-connectivity links may use the BSR throttling algorithms to maintain a target power level of the corresponding link.

In the example of FIG. 5, the BSR throttling algorithm may be used to adjust the uplink duty cycle, similarly to the examples of FIGS. 3 and 4, to control the RF exposure power level. The algorithm reduces the uplink duty cycle by throttling the lower priority data to boost the power up to the target power or to maintain a target power level for higher priority data. In the example, of FIG. 5, a cellular MAC 510 (e.g., for cellular communications, which may be in addition to other controllers for other RATs) may determine the amount of data that it can use for lower priority traffic using different techniques than discussed with reference to FIGS. 3 and 4. In one example, the UE may use an energy request and energy grant architecture, where the UE's cellular MAC 510 requests enough energy to transmit VoIP (plus margin) at $P_{Target}$.

The UE will then receive a grant of energy, denoted $E_{Avail}(n)$, from power manager 505 which may be more than, equal to, or less than the amount that the UE requested. In some cases, the power manager 505 may determine how much energy each technology (e.g., cellular, WiFi, etc.) gets based on the amount of energy available in the compliance window, energy used by the active technologies, energy requested by each technology, etc. The power manager 505 may the provide the cellular MAC 510 the amount of energy $E_{Avail}(n)$. While this example describes a cellular MAC 510, the described techniques may be used for other RATs as well.

The cellular MAC 510 may compute $E_{Data}(n)$ to determine if it has energy to transmit data based on an available energy (e.g., $E_{Avail}(n)$) and a reserve energy level (e.g., $E_{Request}(n)$). The uplink duty cycle is determined based in part on the amount of energy available for lower priority traffic ($E_{Data}(n)$). For example, if the UE received more energy than requested (e.g., $E_{Avail}(n) > E_{Request}(n)$) then the UE can transmit VoIP plus some data at $P_{Target}$. However, data may or may not be throttled (depending on the amount of energy available for $E_{Data}(n)$ and the number of bytes to be transmitted (nbrOfBytesTransmitted(n))). Data is throttled to maintain the target power level ($P_{Target}$) by providing a BSR (e.g., $BSR_{Data}$) that may report a smaller data buffer than is actually present at the UE. If the UE received the amount of energy it requested (e.g. $E_{Avail}(n) = E_{Request}(n)$) then the UE can only transmit VoIP at $P_{Target}$ and must throttle data completely to maintain the target power level ($P_{Target}$), and in such cases $BSR_{Data}$ may be set to zero, and $BSR_{VoIP}$ may report the actual high priority/VoIP data buffer status. If the UE received less energy than requested (e.g. $E_{Avail}(n) < E_{Request}(n)$) then the UE cannot even transmit VoIP at $P_{Target}$, and the UE will transmit at a lower power level and continue to throttle BSR to try to boost the power level to $P_{Target}$.

In some cases, the cellular MAC 510 performs BSR throttling at a BSR throttling manager 520 to control the uplink duty cycle and thereby control the RF exposure power level. The throttling enable manager 515 may provide a signal to the BSR throttling manager 520 to enable BSR throttling, such as based on the presence of current VoIP or high priority traffic, or both.

In some cases, $P_{Target}$ may be dynamically updated automatically by the UE. For example, the UE may set the target power based on a link budget equation/model, or the UE may set the target power using a power control equation as described in existing 3GPP standards. In some cases, the UE may use a link budget equation to automatically update $P_{Target}$, such as based on an estimated path loss, a signal-to-noise-ratio (SNR) target, a target number of RBs to transmit, an estimate of receiver noise, a target block error rate (BLER), an actual BLER, an ACK/NACK or success/failure ratio for one or more time periods, or any combinations thereof. In some cases, $P_{Target}$ may be determined by solving a link budget equation for the transmit power ($P_{Tx}(n)$) that is based on, for example, the target SNR, a level of thermal noise, a subcarrier spacing (SCS) used for communications, a number of subcarriers per physical resource block (PRB), a target number of RBs, the estimate of receiver noise, or any combinations thereof. In other cases, the UE may use a modified version of the power control equation provided in the 3GPP specs to automatically update $P_{Target}$. In such cases, the UE may update $P_{Target}$ by using a physical uplink shared channel (PUSCH) power calculation to determine a requested PUSCH power and then setting the target power limit as the smallest of the requested PUSCH power and the maximum transmit power limit (MTPL). In any case, in one or more of the examples described herein, the $P_{Target}$ may be determined by taking the smallest of the calculated target power level and a maximum transmission power limit (e.g., $P_{Target}$=MIN(calculated target power, maximum transmission power limit)).

Figure 6:
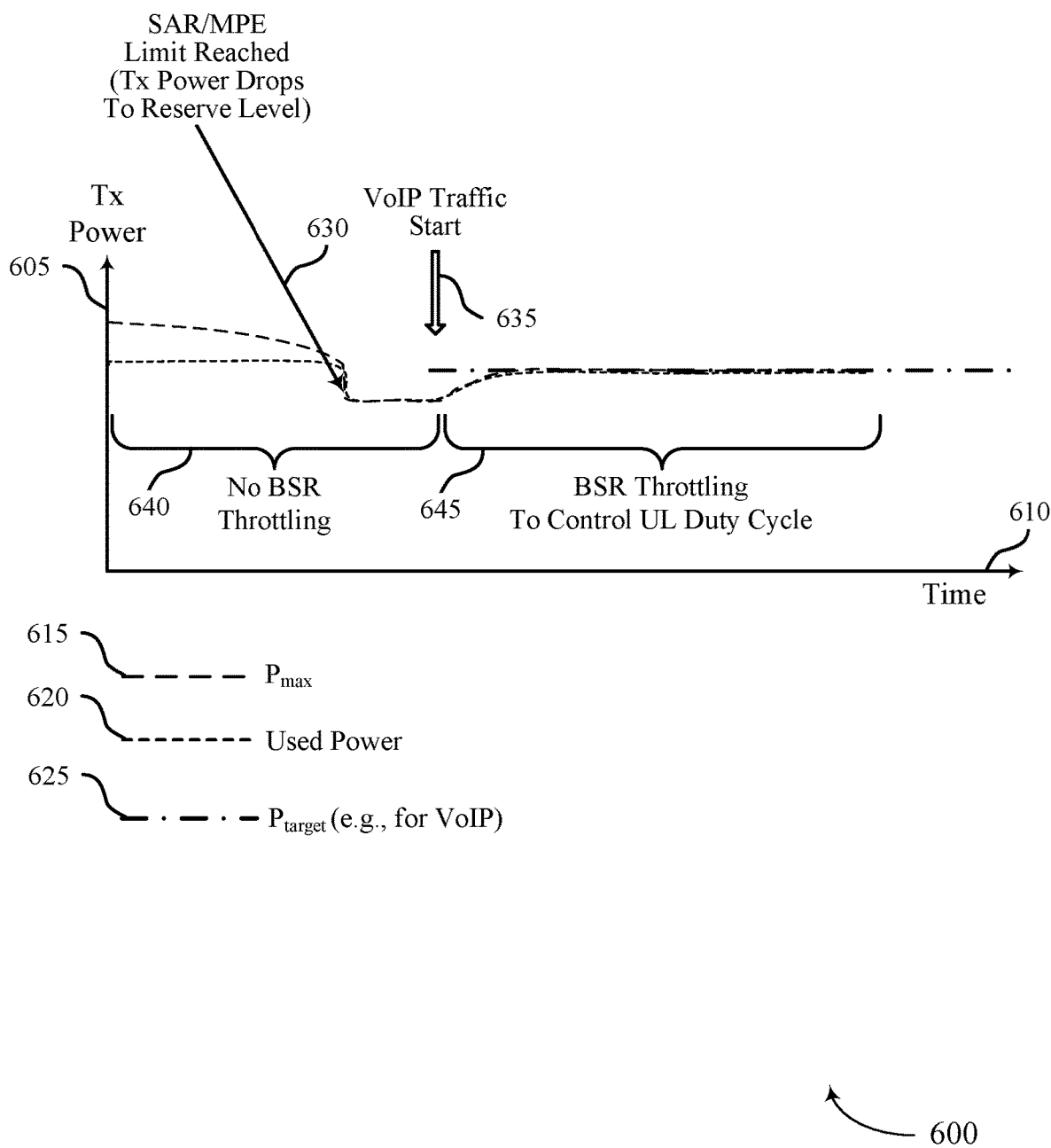
FIG. 6 illustrates an example of transmit power levels based on techniques for managing exposure using uplink duty cycling in accordance with aspects of the present disclosure.

FIG. 6 illustrates an example of transmit power levels 600 that supports techniques for managing exposure using uplink duty cycling in accordance with aspects of the present disclosure. The example of transmit power levels 600 may be implemented by a UE (e.g., a UE 115) such as discussed with reference to FIGS. 1-5, or another wireless device that operates in accordance with one or more RF exposure limits (e.g., SAR/MPE limits). In this example, a UE may use a transmit power 605 per time 610 in which a value of $P_{max}$ 615 may be provided by a power manager or power management block, based on RF exposure compliance limits. An actual used power 620 of the UE may be based on UE transmissions, and a target power 625 ($P_{target}$) may be based on a target for reliable high priority/VoIP communications.

In this example, a relatively large amount of best effort data may be present at the UE prior to a start of VoIP traffic at 635. In this example, the UE may transmit the best effort data using a relatively high power at the beginning of the data burst, such that the UE must drop the power limit at point 630 to a reserve power level since the UE has used all the energy that was available above the reserve level. In this example, the best effort data is reported in a BSR with no throttling during period 640 prior to the arrival of VoIP traffic. In order to provide for more reliable VoIP communications, the UE may perform BSR throttling for period 645, according to techniques discussed herein to control the uplink duty cycle and drive a transmit power to $P_{target}$. In this example, the reporting of the best effort data buffer may be adjusted to reduce uplink grant resources such that the SAR/MPE limits may be complied with using uplink transmissions having a transmit power of $P_{target}$. Thereafter, the power limit BSR throttling algorithm maintains the RF exposure power limit as close to the target power level as possible.

Figure 7:
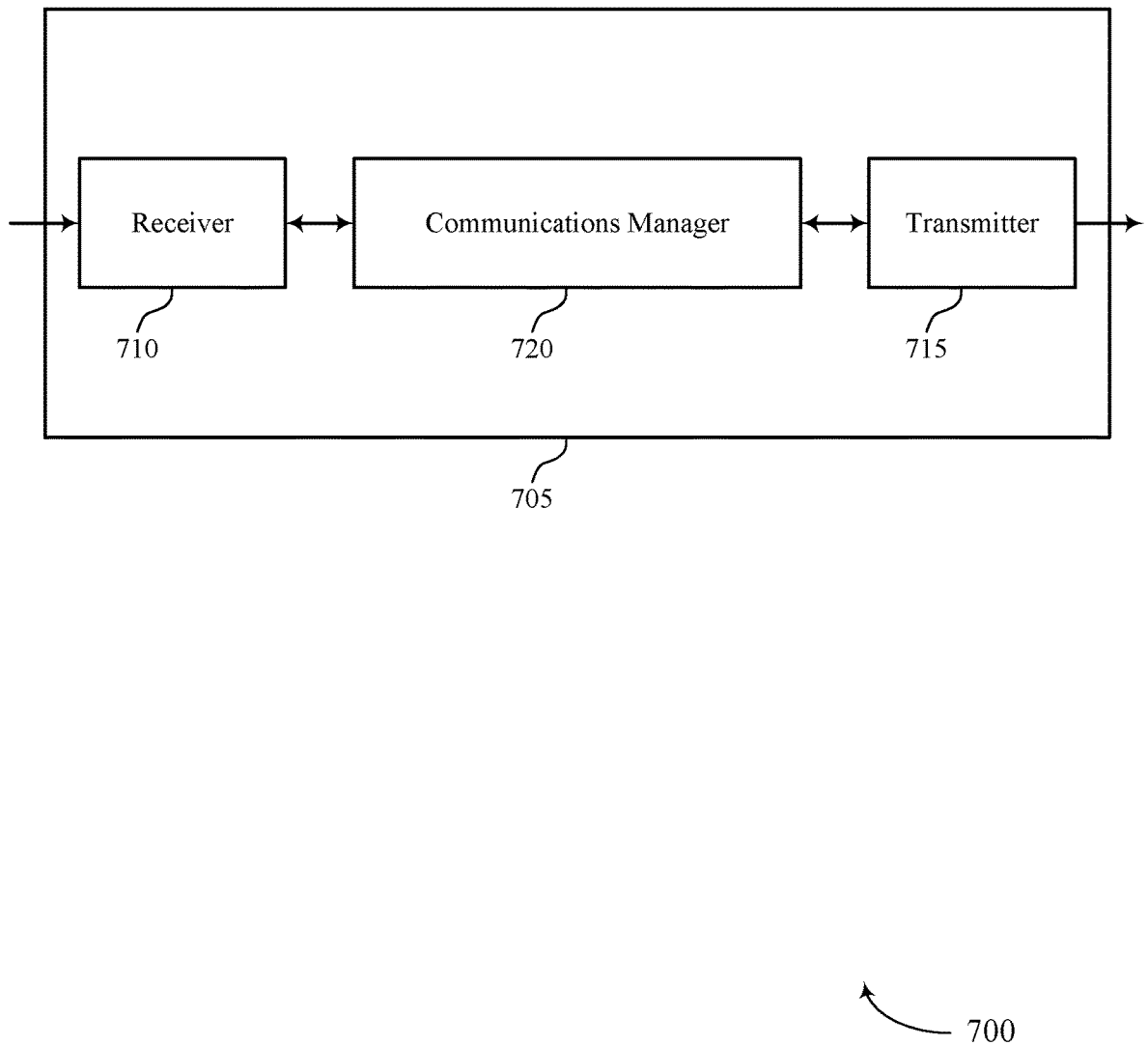
FIGS. 7 and 8 show block diagrams of devices that support techniques for managing exposure using uplink duty cycling in accordance with aspects of the present disclosure.

FIG. 7 shows a block diagram 700 of a device 705 that supports techniques for managing exposure using uplink duty cycling in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for managing exposure using uplink duty cycling). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for managing exposure using uplink duty cycling). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for managing exposure using uplink duty cycling as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for determining, based on a maximum permissible exposure (MPE) or a specific absorption rate (SAR) associated with a first time period and one or more second power levels of one or more second time periods in an exposure threshold compliance window, an amount of available power or energy for uplink transmissions from the UE during the first time period. The communications manager 720 may be configured as or otherwise support a means for identifying, based on the amount of available power or energy for uplink transmissions, an uplink data buffer size for a buffer status report. The communications manager 720 may be configured as or otherwise support a means for transmitting the buffer status report to an access network entity.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for uplink duty cycling to provide enhanced reliability for communications while maintaining compliance with exposure thresholds. Uplink duty cycling techniques as discussed herein may allow higher priority transmissions at a target power value to be maintained through lower priority traffic (e.g., best effort data traffic) throttling. Thus, latency, bandwidth, and network efficiency may be enhanced, providing reduced power consumption (e.g., through fewer retransmissions, higher coding rates, etc.) and improved user experience.

Figure 8:
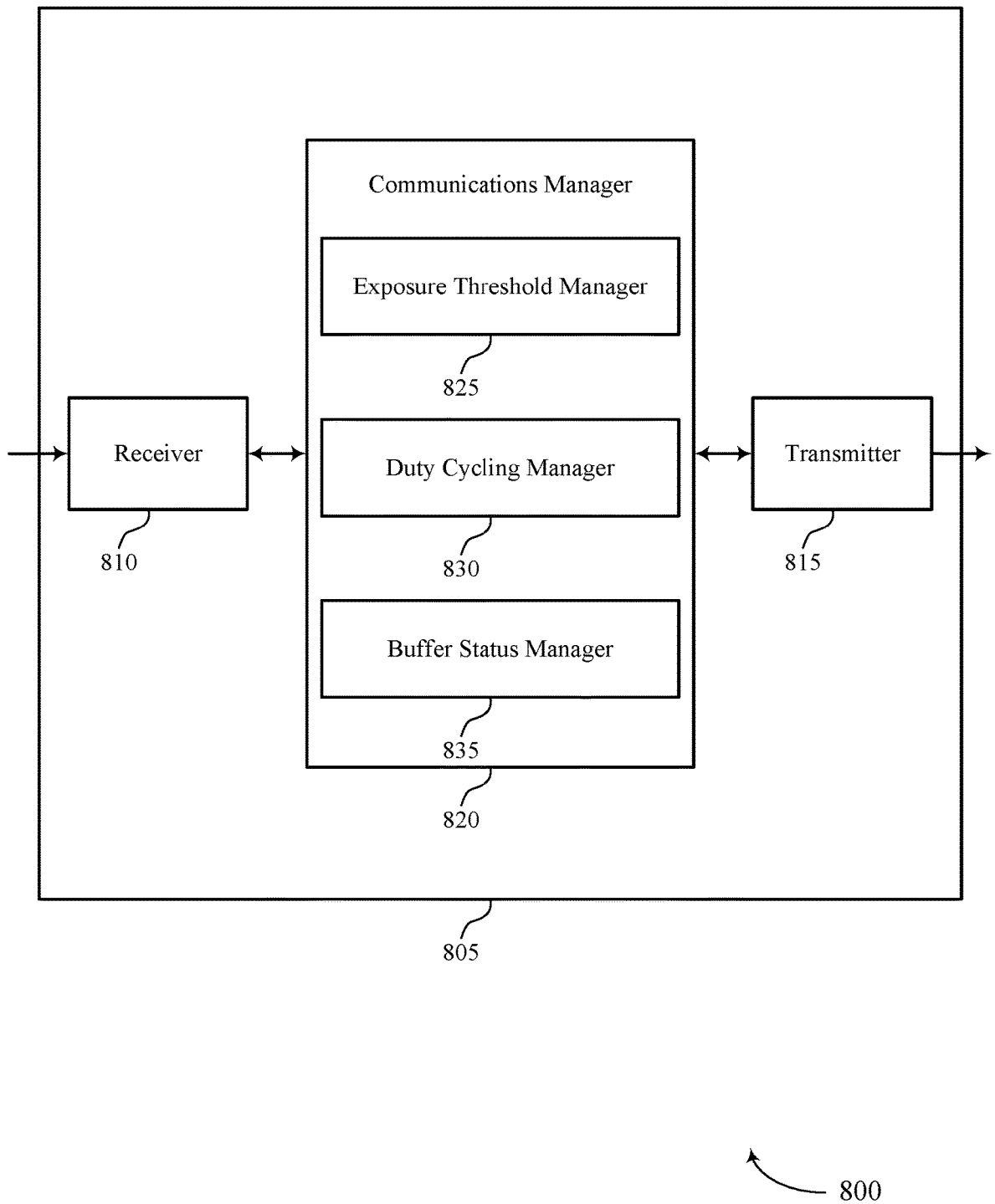

FIG. 8 shows a block diagram 800 of a device 805 that supports techniques for managing exposure using uplink duty cycling in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for managing exposure using uplink duty cycling). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for managing exposure using uplink duty cycling). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for managing exposure using uplink duty cycling as described herein. For example, the communications manager 820 may include an exposure threshold manager 825, a duty cycling manager 830, a buffer status manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The exposure threshold manager 825 may be configured as or otherwise support a means for determining, based on a maximum permissible exposure (MPE) or a specific absorption rate (SAR) associated with a first time period and one or more second power levels of one or more second time periods in an exposure threshold compliance window, an amount of available power or energy for uplink transmissions from the UE during the first time period. The duty cycling manager 830 may be configured as or otherwise support a means for identifying, based on the amount of available power or energy for uplink transmissions, an uplink data buffer size for a buffer status report. The buffer status manager 835 may be configured as or otherwise support a means for transmitting the buffer status report to an access network entity.

Figure 9:
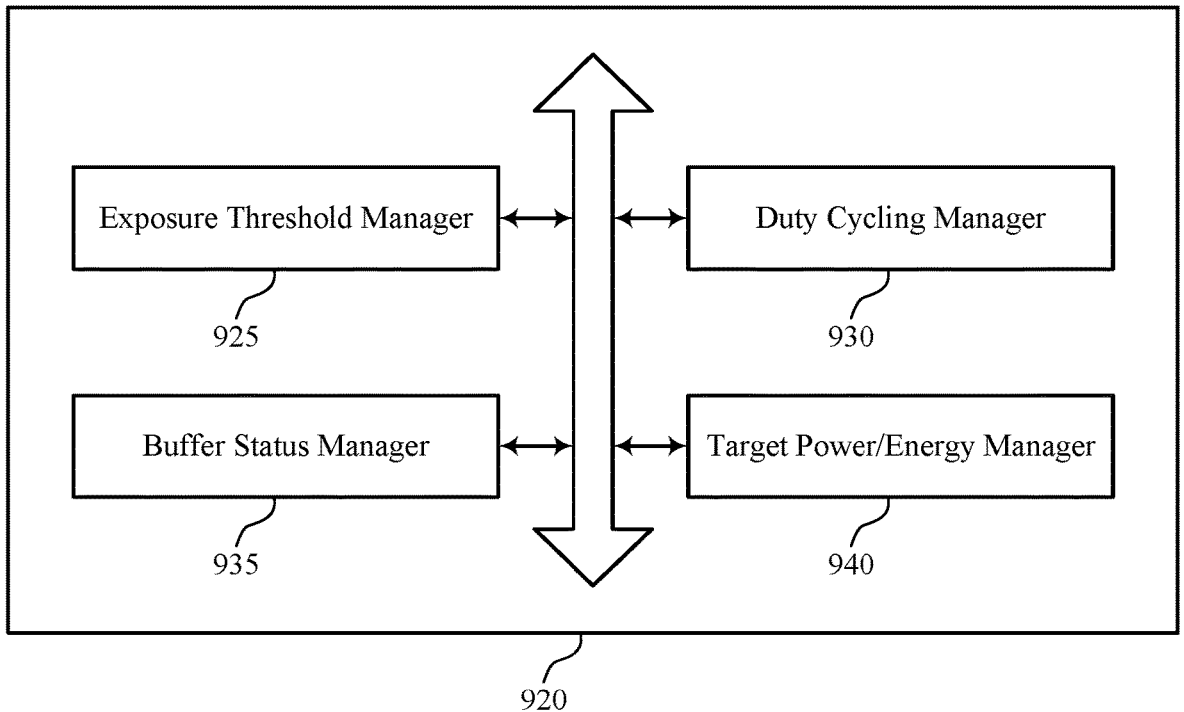
FIG. 9 shows a block diagram of a communications manager that supports techniques for managing exposure using uplink duty cycling in accordance with aspects of the present disclosure.

FIG. 9 shows a block diagram 900 of a communications manager 920 that supports techniques for managing exposure using uplink duty cycling in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for managing exposure using uplink duty cycling as described herein. For example, the communications manager 920 may include an exposure threshold manager 925, a duty cycling manager 930, a buffer status manager 935, a target power/energy manager 940, or any combination thereof. Each of these components may communicate, directly or indirectly, with one another (e.g., via one or more buses).

The communications manager 920 may support wireless communications at a UE in accordance with examples as disclosed herein. The exposure threshold manager 925 may be configured as or otherwise support a means for determining, based on a maximum permissible exposure (MPE) or a specific absorption rate (SAR) associated with a first time period and one or more second power levels of one or more second time periods in an exposure threshold compliance window, an amount of available power or energy for uplink transmissions from the UE during the first time period. The duty cycling manager 930 may be configured as or otherwise support a means for identifying, based on the amount of available power or energy for uplink transmissions, an uplink data buffer size for a buffer status report. The buffer status manager 935 may be configured as or otherwise support a means for transmitting the buffer status report to an access network entity.

In some examples, the uplink data buffer size is a reduced buffer size relative to an unadjusted buffer size at the UE, and where the reduced buffer size adjusts an uplink duty cycle of the UE by throttling an amount of uplink grants received from the access network entity. In some examples, the identifying the uplink data buffer size adjusts an amount of relatively low priority data that is reported to allow data traffic to be transmitted at higher power, with less fragmentation, with a higher success rate, with fewer retransmissions relative to the unadjusted buffer size, or any combinations thereof.

In some examples, to support identifying, the target power/energy manager 940 may be configured as or otherwise support a means for identifying a target power or energy for the first time period. In some examples, to support identifying, the duty cycling manager 930 may be configured as or otherwise support a means for adjusting the uplink data buffer size based on the target power or energy and the amount of available power or energy for the first time period, and where a reduced uplink data buffer size drives the amount of available power or energy for the first time period and the one or more second time periods towards the target power or energy.

In some examples, an amount of power or energy that can be used in the first time period is determined based on an amount of power or energy based on available energy for the first time period, a reserve energy level, a reserve energy level, an amount of energy previously used in the exposure threshold compliance window that becomes available for the one or more second time periods, a target power for uplink transmissions from the UE, a prior target power determined prior to the first time period, or any combinations thereof. In some examples, the amount of power or energy that can be used in the first time period is determined to be zero when an energy associated with the target power exceeds a sum of the available energy for the first time period, the reserve energy level, and the amount of energy that becomes available for the one or more second time periods.

In some examples, to support identifying, the duty cycling manager 930 may be configured as or otherwise support a means for determining a number of throttleable lower priority bytes associated with the first time period based on the amount of power or energy that can be used in the first time period, and where the uplink data buffer size is based on the number of throttleable lower priority bytes. In some examples, the number of throttleable lower priority bytes is determined based on a first portion of the amount of energy that can be used in the first time period that remains after reserving a second portion of the amount of energy for higher priority traffic. In some examples, the number of throttleable lower priority bytes is determined based on a difference between a total number of available bytes that can be transmitted in the first time period and a number of higher priority bytes for higher priority traffic. In some examples, the uplink data buffer size includes an amount of bytes for higher priority traffic and the determined number of throttleable lower priority bytes.

In some examples, the target power/energy manager 940 may be configured as or otherwise support a means for determining an amount of power or energy that can be used in the first time period based on a maximum transmit power or energy for the first time period, a reserved power or energy level, an amount of energy previously used in the exposure threshold compliance window that becomes available for the one or more second time periods, a target power for uplink transmissions from the UE, a prior target power determined prior to the first time period, or any combinations thereof.

In some examples, the uplink data buffer size includes a best effort buffer size that is adjusted based on a number of throttleable lower priority bytes associated with the first time period, and a voice over Internet protocol (VOIP) buffer size that is an unadjusted value of a VOIP buffer at the UE. In some examples, the uplink data buffer size is adjusted based on a target power or energy for the first time period, and where the target power is updated by the UE for the one or more second time periods in the exposure threshold compliance window. In some examples, the target power or energy is updated based on a link budget model or power control equation associated with the first time period.

In some examples, the link budget model is a function of one or more of a path loss, a target signal to noise ratio (SNR), a target number of resource blocks (RBs) to be transmitted, an estimated receiver noise, a target block error rate (BLER), an actual BLER of uplink transmissions from the UE over a predetermined time period, a ratio of successful to unsuccessful transmissions from the UE to the access network entity over the predetermined time period, a thermal noise associated with a channel between the UE and the access network entity, a subcarrier spacing for communications between the UE and the access network entity, or any combinations thereof. In some examples, the power control equation is a function of a requested shared channel transmission power provided at an initial time period of the exposure threshold compliance window, and a maximum transmit power level.

In some examples, the target power/energy manager 940 may identify a first portion of an amount of energy that can be used in the first time period that remains after reserving a second portion of the amount of energy for higher priority traffic, and the target power/energy manager 940 may split the first portion of the amount of energy to a first amount of energy for transmitting in the first time period on a first link established in a dual-connectivity configuration and a second amount of energy for transmitting in the first time period on a second link established in the dual-connectivity configuration. In some examples, the target power/energy manager 940 may split the first portion of the amount of energy to the first amount of energy and the second amount of energy based at least in part on one or more metrics or equations that represent a channel or link performance of the first link, the second link, or both. In some examples, the one or more metrics or equations that represent the channel or link performance of the first link, the second link, or both are based at least in part on a path loss, energy-per-byte statistic, throughput, a link budget model, or a combination thereof of the first link, the second link, or both.

In some examples, the duty cycling manager 930 may determine a first number of throttleable lower priority bytes associated with the first time period based at least in part on the first amount of energy, and the duty cycling manager 930 may determine a second number of throttleable lower priority bytes associated with the first time period based at least in part on the second amount of energy, wherein the uplink data buffer size is based at least in part on the first number of throttleable lower priority bytes and the second number of throttleable lower priority bytes. In some examples, a total of the first number of throttleable lower priority bytes and the second number of throttleable lower priority bytes is determined based at least in part on a difference between a total number of available bytes that can be transmitted in the first time period and a number of higher priority bytes for higher priority traffic.

Figure 10:
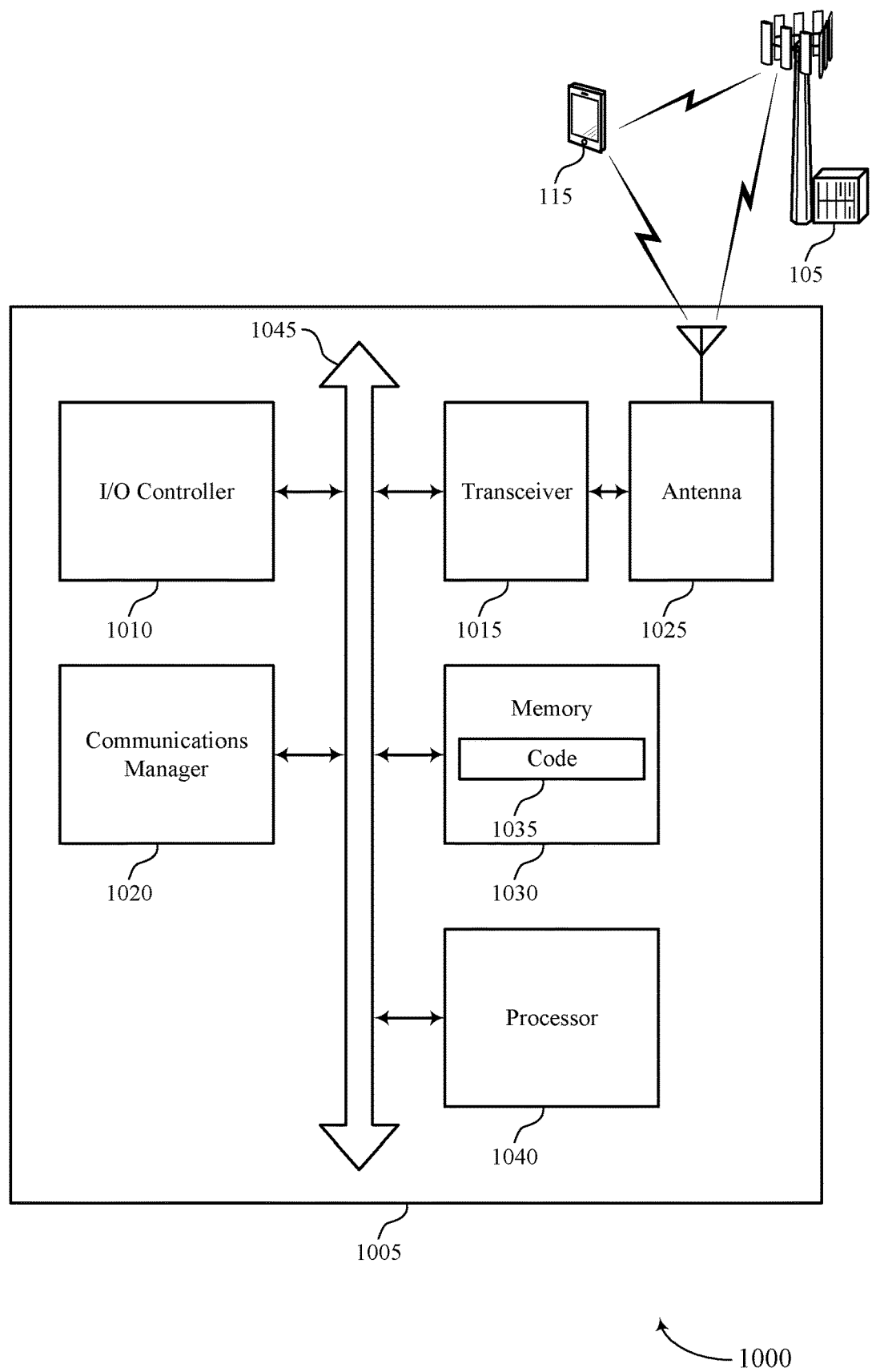
FIG. 10 shows a diagram of a system including a device that supports techniques for managing exposure using uplink duty cycling in accordance with aspects of the present disclosure.

FIG. 10 shows a diagram of a system 1000 including a device 1005 that supports techniques for managing exposure using uplink duty cycling in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for managing exposure using uplink duty cycling). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for determining, based on a maximum permissible exposure (MPE) or a specific absorption rate (SAR) associated with a first time period and one or more second power levels of one or more second time periods in an exposure threshold compliance window, an amount of available power or energy for uplink transmissions from the UE during the first time period. The communications manager 1020 may be configured as or otherwise support a means for identifying, based on the amount of available power or energy for uplink transmissions, an uplink data buffer size for a buffer status report. The communications manager 1020 may be configured as or otherwise support a means for transmitting the buffer status report to an access network entity.

By including or configuring the communications manager 1020 in accordance with examples as described herein, the device 1005 may support techniques for uplink duty cycling to provide enhanced reliability for communications while maintaining compliance with exposure thresholds. Uplink duty cycling techniques as discussed herein may allow higher priority transmissions at a target power value to be maintained through lower priority traffic (e.g., best effort data traffic) throttling. Thus, latency, bandwidth, and network efficiency may be enhanced, providing reduced power consumption (e.g., through fewer retransmissions, higher coding rates, etc.) and improved user experience.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for managing exposure using uplink duty cycling as described herein, or the processor 1040 and the memory 1030 may be otherwise configured to perform or support such operations.

Figure 11:
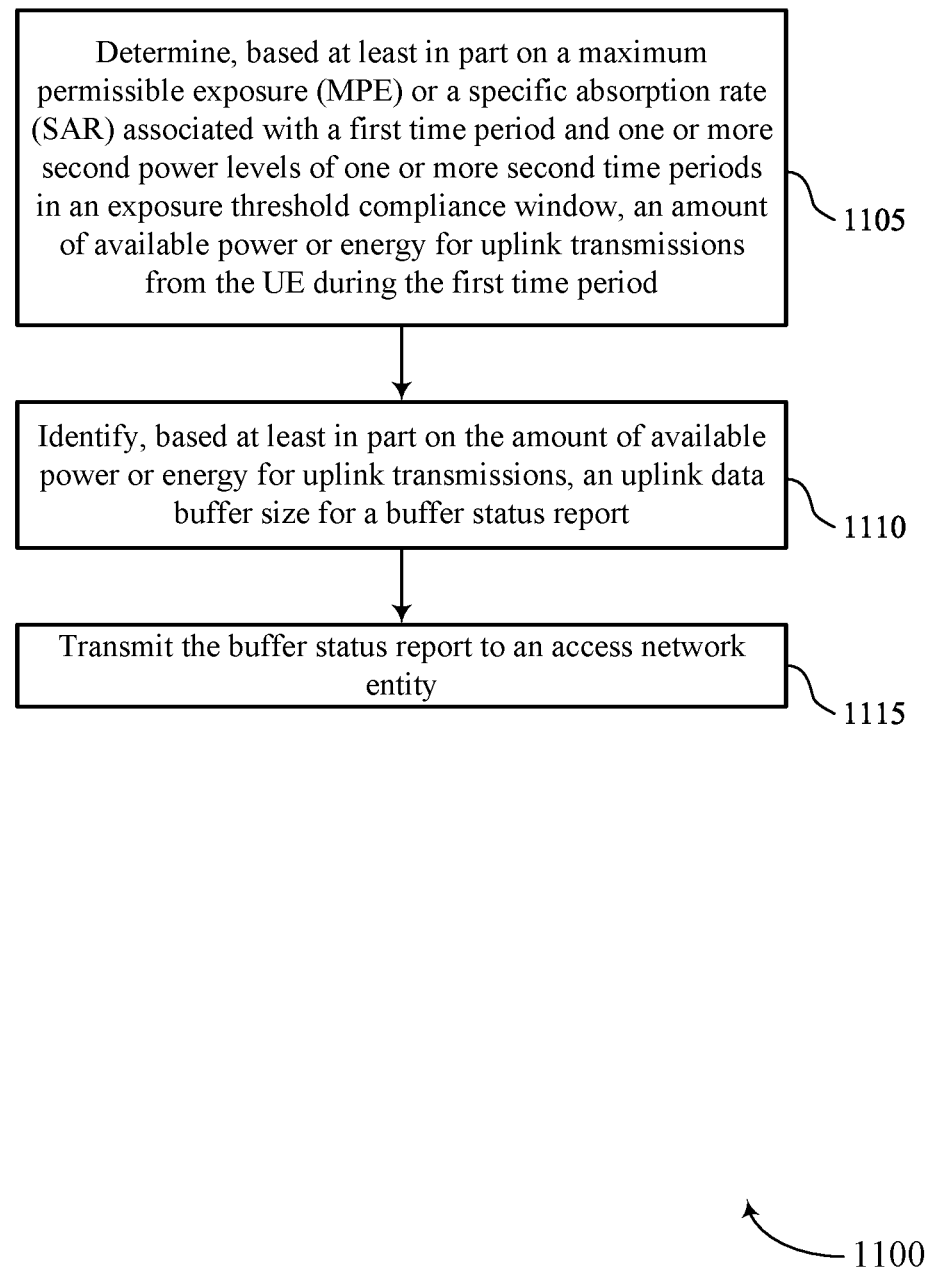
FIGS. 11 through 14 show flowcharts illustrating methods that support techniques for managing exposure using uplink duty cycling in accordance with aspects of the present disclosure.

FIG. 11 shows a flowchart illustrating a method 1100 that supports techniques for managing exposure using uplink duty cycling in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include determining, based on a maximum permissible exposure (MPE) or a specific absorption rate (SAR) associated with a first time period and one or more second power levels of one or more second time periods in an exposure threshold compliance window, an amount of available power or energy for uplink transmissions from the UE during the first time period. The operations of 1105 may be performed in accordance with examples as disclosed herein. In some examples, aspects of the operations of 1105 may be performed by an exposure threshold manager 925 as described with reference to FIG. 9.

At 1110, the method may include identifying, based on the amount of available power or energy for uplink transmissions, an uplink data buffer size for a buffer status report. The operations of 1110 may be performed in accordance with examples as disclosed herein. In some examples, aspects of the operations of 1110 may be performed by a duty cycling manager 930 as described with reference to FIG. 9.

At 1115, the method may include transmitting the buffer status report to an access network entity. The operations of 1115 may be performed in accordance with examples as disclosed herein. In some examples, aspects of the operations of 1115 may be performed by a buffer status manager 935 as described with reference to FIG. 9.

Figure 12:
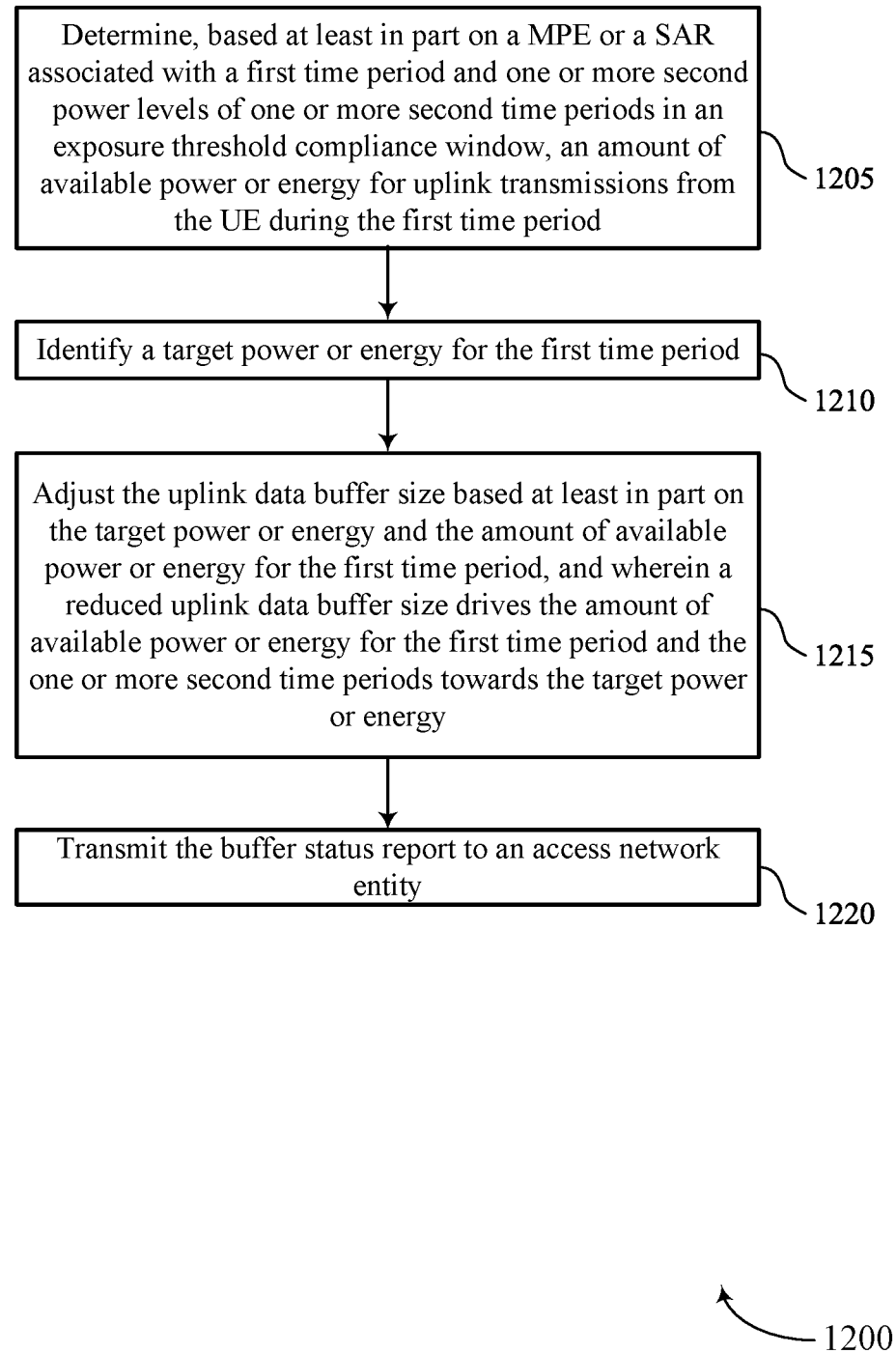

FIG. 12 shows a flowchart illustrating a method 1200 that supports techniques for managing exposure using uplink duty cycling in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include determining, based on a maximum permissible exposure (MPE) or a specific absorption rate (SAR) associated with a first time period and one or more second power levels of one or more second time periods in an exposure threshold compliance window, an amount of available power or energy for uplink transmissions from the UE during the first time period. The operations of 1205 may be performed in accordance with examples as disclosed herein. In some examples, aspects of the operations of 1205 may be performed by an exposure threshold manager 925 as described with reference to FIG. 9.

At 1210, the method may include identifying a target power or energy for the first time period. The operations of 1210 may be performed in accordance with examples as disclosed herein. In some examples, aspects of the operations of 1210 may be performed by a target power/energy manager 940 as described with reference to FIG. 9.

At 1215, the method may include adjusting the uplink data buffer size based on the target power or energy and the amount of available power or energy for the first time period, and where a reduced uplink data buffer size drives the amount of available power or energy for the first time period and the one or more second time periods towards the target power or energy. The operations of 1215 may be performed in accordance with examples as disclosed herein. In some examples, aspects of the operations of 1215 may be performed by a duty cycling manager 930 as described with reference to FIG. 9.

Figure 13:
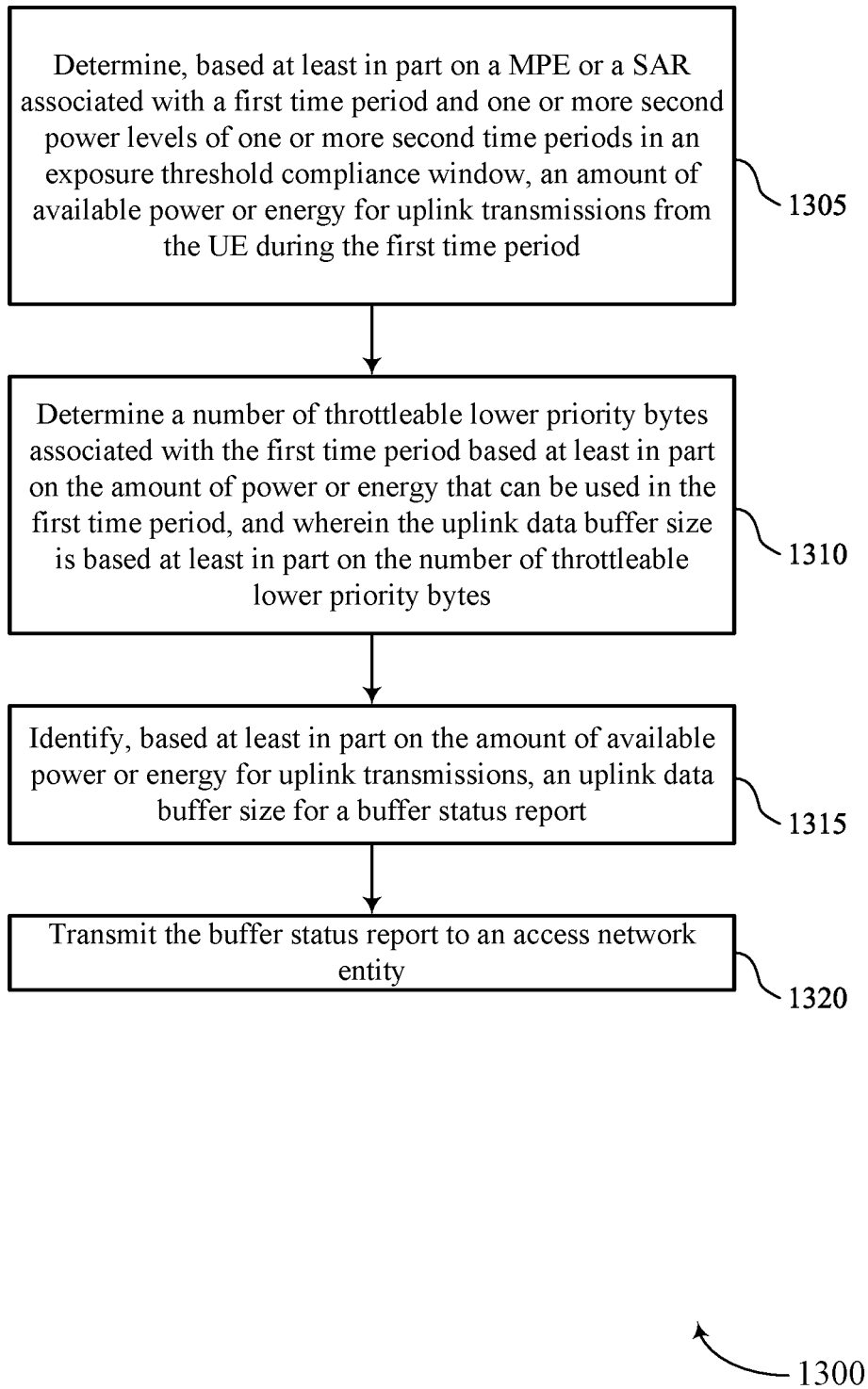

At 1220, the method may include transmitting the buffer status report to an access network entity. The operations of 1220 may be performed in accordance with examples as disclosed herein. In some examples, aspects of the operations of 1220 may be performed by a buffer status manager 935 as described with reference to FIG. 9. In some cases, the uplink data buffer size may be a reduced buffer size relative to an unadjusted buffer size at the UE, and where the reduced buffer size adjusts an uplink duty cycle of the UE by throttling an amount of uplink grants received from the access network entity. In some cases, the uplink data buffer size is adjusted such that a reduced amount of relatively low priority data is reported to allow data traffic to be transmitted at higher power, with less fragmentation, with a higher success rate, with fewer retransmissions relative to the unadjusted buffer size, or any combinations thereof FIG. 13 shows a flowchart illustrating a method 1300 that supports techniques for managing exposure using uplink duty cycling in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1305, the method may include determining, based on a maximum permissible exposure (MPE) or a specific absorption rate (SAR) associated with a first time period and one or more second power levels of one or more second time periods in an exposure threshold compliance window, an amount of available power or energy for uplink transmissions from the UE during the first time period. The operations of 1305 may be performed in accordance with examples as disclosed herein. In some examples, aspects of the operations of 1305 may be performed by an exposure threshold manager 925 as described with reference to FIG. 9. In some cases, an amount of power or energy that can be used in the first time period is determined based on an amount of power or energy based on available energy for the first time period, a reserve energy level, a reserve energy level, an amount of energy previously used in the exposure threshold compliance window that becomes available for the one or more second time periods, a target power for uplink transmissions from the UE, a prior target power determined prior to the first time period, or any combinations thereof At 1310, the method may include determining a number of throttleable lower priority bytes associated with the first time period based on the amount of power or energy that can be used in the first time period, and where the uplink data buffer size is based on the number of throttleable lower priority bytes. The operations of 1310 may be performed in accordance with examples as disclosed herein. In some examples, aspects of the operations of 1310 may be performed by a duty cycling manager 930 as described with reference to FIG. 9.

At 1315, the method may include identifying, based on the amount of available power or energy for uplink transmissions, an uplink data buffer size for a buffer status report. The operations of 1315 may be performed in accordance with examples as disclosed herein. In some examples, aspects of the operations of 1315 may be performed by a duty cycling manager 930 as described with reference to FIG. 9.

At 1320, the method may include transmitting the buffer status report to an access network entity. The operations of 1320 may be performed in accordance with examples as disclosed herein. In some examples, aspects of the operations of 1320 may be performed by a buffer status manager 935 as described with reference to FIG. 9.

Figure 14:
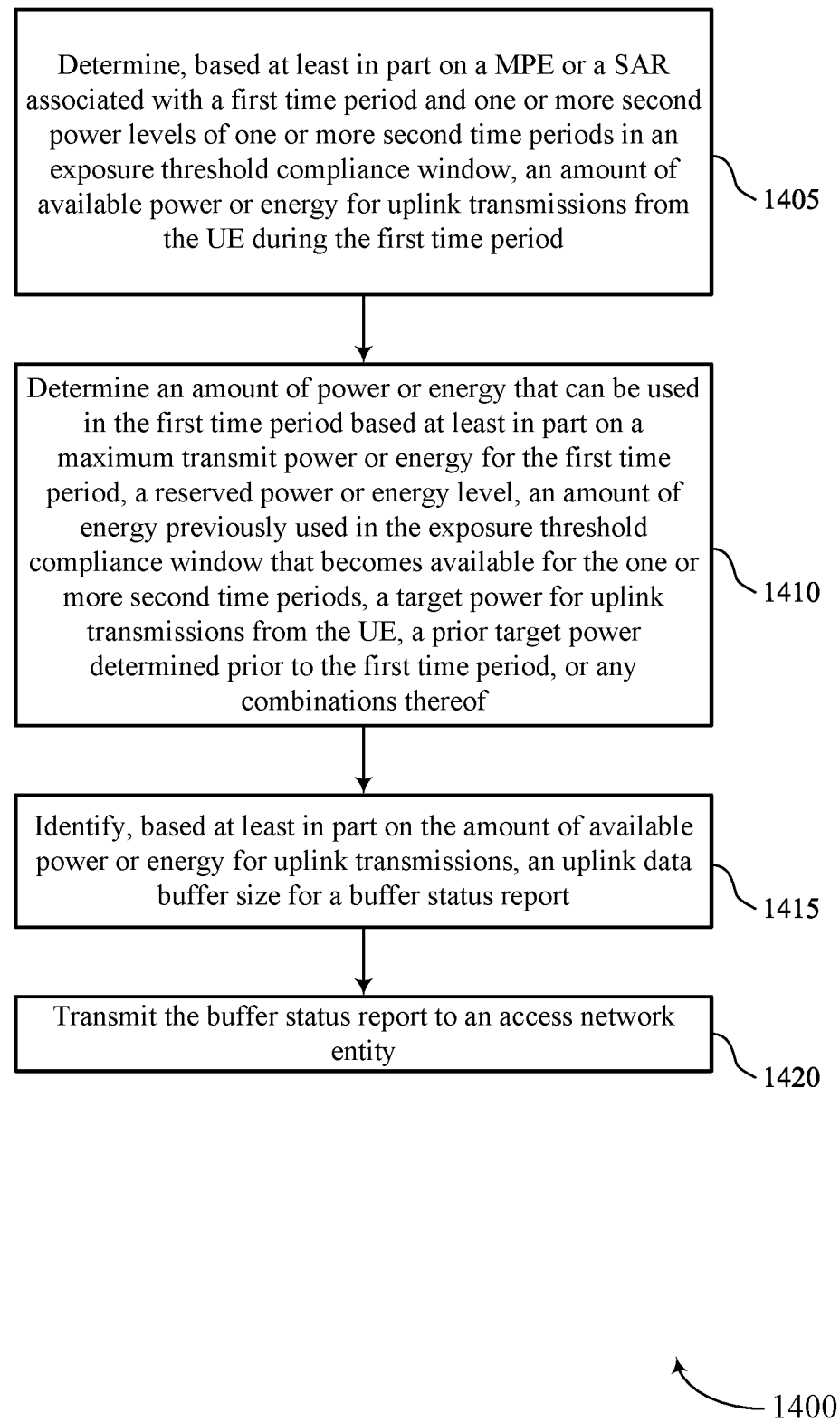

FIG. 14 shows a flowchart illustrating a method 1400 that supports techniques for managing exposure using uplink duty cycling in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1405, the method may include determining, based on a maximum permissible exposure (MPE) or a specific absorption rate (SAR) associated with a first time period and one or more second power levels of one or more second time periods in an exposure threshold compliance window, an amount of available power or energy for uplink transmissions from the UE during the first time period. The operations of 1405 may be performed in accordance with examples as disclosed herein. In some examples, aspects of the operations of 1405 may be performed by an exposure threshold manager 925 as described with reference to FIG. 9.

At 1410, the method may include determining an amount of power or energy that can be used in the first time period based on a maximum transmit power or energy for the first time period, a reserved power or energy level, an amount of energy previously used in the exposure threshold compliance window that becomes available for the one or more second time periods, a target power for uplink transmissions from the UE, a prior target power determined prior to the first time period, or any combinations thereof. The operations of 1410 may be performed in accordance with examples as disclosed herein. In some examples, aspects of the operations of 1410 may be performed by a target power/energy manager 940 as described with reference to FIG. 9.

At 1415, the method may include identifying, based on the amount of available power or energy for uplink transmissions, an uplink data buffer size for a buffer status report. The operations of 1415 may be performed in accordance with examples as disclosed herein.

In some examples, aspects of the operations of 1415 may be performed by a duty cycling manager 930 as described with reference to FIG. 9.

At 1420, the method may include transmitting the buffer status report to an access network entity. The operations of 1420 may be performed in accordance with examples as disclosed herein. In some examples, aspects of the operations of 1420 may be performed by a buffer status manager 935 as described with reference to FIG. 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: determining, based at least in part on a maximum permissible exposure (MPE) or a specific absorption rate (SAR) associated with a first time period and one or more second power levels of one or more second time periods in an exposure threshold compliance window, an amount of available power or energy for uplink transmissions from the UE during the first time period; identifying, based at least in part on the amount of available power or energy for uplink transmissions, an uplink data buffer size for a buffer status report; and transmitting the buffer status report to an access network entity.

Aspect 2: The method of aspect 1, wherein the uplink data buffer size is a reduced buffer size relative to an unadjusted buffer size at the UE, and wherein the reduced buffer size adjusts an uplink duty cycle of the UE by throttling an amount of uplink grants received from the access network entity.

Aspect 3: The method of aspect 2, wherein the identifying the uplink data buffer size adjusts an amount of relatively low priority data that is reported to allow data traffic to be transmitted at higher power, with less fragmentation, with a higher success rate, with fewer retransmissions relative to the unadjusted buffer size, or any combinations thereof Aspect 4: The method of aspect 3, wherein the identifying comprises: identifying a target power or energy for the first time period; and adjusting the uplink data buffer size based at least in part on the target power or energy and the amount of available power or energy for the first time period, and wherein a reduced uplink data buffer size drives the amount of available power or energy for the first time period and the one or more second time periods towards the target power or energy.

Aspect 5: The method of any of aspects 1 through 4, wherein an amount of power or energy that can be used in the first time period is determined based on an amount of power or energy based on available energy for the first time period, a reserve energy level, an amount of energy previously used in the exposure threshold compliance window that becomes available for the one or more second time periods, a target power for uplink transmissions from the UE, a prior target power determined prior to the first time period, or any combinations thereof Aspect 6: The method of aspect 5, wherein the amount of power or energy that can be used in the first time period is determined to be zero when an energy associated with the target power exceeds a sum of the available energy for the first time period, the reserve energy level, and the amount of energy that becomes available for the one or more second time periods Aspect 7: The method of any of aspects 5 through 6, wherein the identifying further comprises: determining a number of throttleable lower priority bytes associated with the first time period based at least in part on the amount of power or energy that can be used in the first time period, and wherein the uplink data buffer size is based at least in part on the number of throttleable lower priority bytes.

Aspect 8: The method of aspect 7, wherein the number of throttleable lower priority bytes is determined based at least in part on a first portion of the amount of energy that can be used in the first time period that remains after reserving a second portion of the amount of energy for higher priority traffic.

Aspect 9: The method of any of aspects 7 through 8, wherein the number of throttleable lower priority bytes is determined based at least in part on a difference between a total number of available bytes that can be transmitted in the first time period and a number of higher priority bytes for higher priority traffic.

Aspect 10: The method of any of aspects 7 through 9, wherein the uplink data buffer size includes an amount of bytes for higher priority traffic and the determined number of throttleable lower priority bytes.

Aspect 11: The method of any of aspects 1 through 4, further comprising: determining an amount of power or energy that can be used in the first time period based at least in part on a maximum transmit power or energy for the first time period, a reserved power or energy level, an amount of energy previously used in the exposure threshold compliance window that becomes available for the one or more second time periods, a target power for uplink transmissions from the UE, a prior target power determined prior to the first time period, or any combinations thereof Aspect 12: The method of any of aspects 1 through 11, wherein the uplink data buffer size includes a best effort buffer size that is adjusted based at least in part on a number of throttleable lower priority bytes associated with the first time period, and a voice over Internet protocol (VOIP) buffer size that is an unadjusted value of a VOIP buffer at the UE.

Aspect 13: The method of any of aspects 1 through 12, wherein the uplink data buffer size is adjusted based at least in part on a target power or energy for the first time period, and wherein the target power is updated by the UE for the one or more second time periods in the exposure threshold compliance window.

Aspect 14: The method of aspect 13, wherein the target power or energy is updated based at least in part on a link budget model or power control equation associated with the first time period.

Aspect 15: The method of aspect 14, wherein the link budget model is a function of one or more of a path loss, a target signal to noise ratio (SNR), a target number of resource blocks (RBs) to be transmitted, an estimated receiver noise, a target block error rate (BLER), an actual BLER of uplink transmissions from the UE over a predetermined time period, a ratio of successful to unsuccessful transmissions from the UE to the access network entity over the predetermined time period, a thermal noise associated with a channel between the UE and the access network entity, a subcarrier spacing for communications between the UE and the access network entity, or any combinations thereof.

Aspect 16: The method of any of aspects 14 through 15, wherein the power control equation is a function of a requested shared channel transmission power provided at an initial time period of the exposure threshold compliance window, and a maximum transmit power level.

Aspect 17: The method of any of aspects 1 through 16, further comprising: selecting at least a first link from two or more communication links that are established in a dual-connectivity configuration, the first link selected based at least in part on a presence of higher priority traffic at the first link; and determining a target power level to be maintained at each selected link, and wherein the uplink data buffer size is identified for each selected link based at least in part on the amount of available power or energy for uplink transmissions during the first time period.

Aspect 18: The method of any of aspects 1 through 17, further comprising: identifying a first portion of an amount of energy that can be used in the first time period that remains after reserving a second portion of the amount of energy for higher priority traffic; and splitting the first portion of the amount of energy to a first amount of energy for transmitting in the first time period on a first link established in a dual-connectivity configuration and a second amount of energy for transmitting in the first time period on a second link established in the dual-connectivity configuration.

Aspect 19: The method of any of aspects 1 through 18, wherein splitting the first portion of the amount of energy to the first amount of energy and the second amount of energy comprises: splitting the first portion of the amount of energy to the first amount of energy and the second amount of energy based at least in part on one or more metrics or equations that represent a channel or link performance of the first link, the second link, or both.

Aspect 20: The method of any of aspects 1 through 19, wherein the one or more metrics or equations that represent the channel or link performance of the first link, the second link, or both are based at least in part on a path loss, energy-per-byte statistic, throughput, a link budget model, or a combination thereof of the first link, the second link, or both.

Aspect 21: The method of any of aspects 1 through 20, further comprising: determining a first number of throttleable lower priority bytes associated with the first time period based at least in part on the first amount of energy; and determining a second number of throttleable lower priority bytes associated with the first time period based at least in part on the second amount of energy, wherein the uplink data buffer size is based at least in part on the first number of throttleable lower priority bytes and the second number of throttleable lower priority bytes.

Aspect 22: The method of any of aspects 1 through 21, wherein a total of the first number of throttleable lower priority bytes and the second number of throttleable lower priority bytes is determined based at least in part on a difference between a total number of available bytes that can be transmitted in the first time period and a number of higher priority bytes for higher priority traffic.

Aspect 23: An apparatus for wireless communications at a UE, comprising a processor; memory coupled with the processor; and instructions stored in the memory and executable by the processor to cause the apparatus to perform a method of any of aspects 1 through 22.

Aspect 24: An apparatus for wireless communications at a UE, comprising at least one means for performing a method of any of aspects 1 through 22.

Aspect 25: A non-transitory computer-readable medium storing code for wireless communications at a UE, the code comprising instructions executable by a processor to perform a method of any of aspects 1 through 22.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   determining, based at least in part on a maximum permissible exposure (MPE) or a specific absorption rate (SAR) associated with a first time period and one or more second power levels of one or more second time periods in an exposure threshold compliance window, an amount of available power or energy for uplink transmissions from the UE during the first time period;
   identifying, based at least in part on the amount of available power or energy for uplink transmissions, an uplink data buffer size for a buffer status report, wherein an amount of data indicated by the uplink data buffer size is in accordance with the MPE or SAR, and wherein the uplink data buffer size is different for different amounts of available power or energy for uplink transmissions from the UE during the first time period; and
   transmitting the buffer status report to an access network entity.

2. The method of claim 1, wherein the uplink data buffer size is a reduced buffer size relative to an unadjusted buffer size at the UE, and wherein the reduced buffer size adjusts an uplink duty cycle of the UE by throttling an amount of uplink grants received from the access network entity.

3. The method of claim 2, wherein the identifying the uplink data buffer size adjusts an amount of relatively low priority data that is reported to allow higher priority data traffic to be transmitted at higher power, with less fragmentation, with a higher success rate, with fewer retransmissions relative to the unadjusted buffer size, or any combinations thereof.

4. The method of claim 3, wherein the identifying comprises:
   identifying a target power or energy for the first time period; and
   adjusting the uplink data buffer size based at least in part on the target power or energy and the amount of available power or energy for the first time period, and wherein a reduced uplink data buffer size drives the amount of available power or energy for the first time period and the one or more second time periods towards the target power or energy.

5. The method of claim 1, wherein the amount of available power or energy for uplink transmissions that can be used in the first time period is determined based at least in part on available energy for the first time period, a reserve energy level, an amount of energy previously used in the exposure threshold compliance window that becomes available for the one or more second time periods, a target power for uplink transmissions from the UE, a prior target power determined prior to the first time period, or any combinations thereof.

6. The method of claim 5, wherein the amount of available power or energy that can be used in the first time period is determined to be zero when an energy associated with the target power exceeds a sum of the available energy for the first time period, the reserve energy level, and the amount of energy that becomes available for the one or more second time periods.

7. The method of claim 5, wherein the identifying further comprises:
   determining a number of throttleable lower priority bytes associated with the first time period based at least in part on the amount of available power or energy that can be used in the first time period, and wherein the uplink data buffer size is based at least in part on the number of throttleable lower priority bytes.

8. The method of claim 7, wherein the number of throttleable lower priority bytes is determined based at least in part on a first portion of the amount of energy that can be used in the first time period that remains after reserving a second portion of the amount of energy for higher priority traffic.

9. The method of claim 7, wherein the number of throttleable lower priority bytes is determined based at least in part on a difference between a total number of available bytes that can be transmitted in the first time period and a number of higher priority bytes for higher priority traffic.

10. The method of claim 7, wherein the uplink data buffer size includes an amount of bytes for higher priority traffic and the determined number of throttleable lower priority bytes.

11. The method of claim 1, further comprising:
    determining an amount of power or energy that can be used in the first time period based at least in part on a maximum transmit power or energy for the first time period, a reserved power or energy level, an amount of energy previously used in the exposure threshold compliance window that becomes available for the one or more second time periods, a target power for uplink transmissions from the UE, a prior target power determined prior to the first time period, or any combinations thereof.

12. The method of claim 1, wherein the uplink data buffer size includes a best effort buffer size that is adjusted based at least in part on a number of throttleable lower priority bytes associated with the first time period, and a voice over Internet protocol (VOIP) buffer size that is an unadjusted value of a VOIP buffer at the UE.

13. The method of claim 1, wherein the uplink data buffer size is adjusted based at least in part on a target power or energy for the first time period, and wherein the target power is updated by the UE for the one or more second time periods in the exposure threshold compliance window.

14. The method of claim 13, wherein the target power or energy is updated based at least in part on a link budget model or power control equation associated with the first time period.

15. The method of claim 14, wherein the link budget model is a function of one or more of a path loss, a target signal to noise ratio (SNR), a target number of resource blocks (RBs) to be transmitted, an estimated receiver noise, a target block error rate (BLER), an actual BLER of uplink transmissions from the UE over a predetermined time period, a ratio of successful to unsuccessful transmissions from the UE to the access network entity over the predetermined time period, a thermal noise associated with a channel between the UE and the access network entity, a subcarrier spacing for communications between the UE and the access network entity, or any combinations thereof.

16. The method of claim 14, wherein the power control equation is a function of a requested shared channel transmission power provided at an initial time period of the exposure threshold compliance window and a maximum transmit power level.

17. The method of claim 1, further comprising:
    selecting at least a first link from two or more communication links that are established in a dual-connectivity configuration, the first link selected based at least in part on a presence of higher priority traffic at the first link; and
    determining a target power level to be maintained at each selected link, and wherein the uplink data buffer size is identified for each selected link based at least in part on the amount of available power or energy for uplink transmissions during the first time period.

18. The method of claim 1, further comprising:
identifying a first portion of an amount of energy that can be used in the first time period that remains after reserving a second portion of the amount of energy for higher priority traffic; and
splitting the first portion of the amount of energy to a first amount of energy for transmitting in the first time period on a first link established in a dual-connectivity configuration and a second amount of energy for transmitting in the first time period on a second link established in the dual-connectivity configuration.

19. The method of claim 18, wherein splitting the first portion of the amount of energy to the first amount of energy and the second amount of energy comprises:
splitting the first portion of the amount of energy to the first amount of energy and the second amount of energy based at least in part on one or more metrics or equations that represent a channel or link performance of the first link, the second link, or both.

20. The method of claim 19, wherein the one or more metrics or equations that represent the channel or link performance of the first link, the second link, or both are based at least in part on a path loss, energy-per-byte statistic, throughput, a link budget model, or a combination thereof of the first link, the second link, or both.

21. The method of claim 18, further comprising:
determining a first number of throttleable lower priority bytes associated with the first time period based at least in part on the first amount of energy; and
determining a second number of throttleable lower priority bytes associated with the first time period based at least in part on the second amount of energy, wherein the uplink data buffer size is based at least in part on the first number of throttleable lower priority bytes and the second number of throttleable lower priority bytes.

22. The method of claim 21, wherein a total of the first number of throttleable lower priority bytes and the second number of throttleable lower priority bytes is determined based at least in part on a difference between a total number of available bytes that can be transmitted in the first time period and a number of higher priority bytes for higher priority traffic.

23. An apparatus for wireless communications at a user equipment (UE), comprising:
one or more processors;
one or more memories coupled with the one or more processors; and
instructions stored in the one or more memories and executable by the one or more processors to cause the UE to:
determine, based at least in part on a maximum permissible exposure (MPE) or a specific absorption rate (SAR) associated with a first time period and one or more second power levels of one or more second time periods in an exposure threshold compliance window, an amount of available power or energy for uplink transmissions from the UE during the first time period;
identify, based at least in part on the amount of available power or energy for uplink transmissions, an uplink data buffer size for a buffer status report, wherein an amount of data indicated by the uplink data buffer size is in accordance with the MPE or SAR, and wherein the uplink data buffer size is different for different amounts of available power or energy for uplink transmissions from the UE during the first time period; and
transmit the buffer status report to an access network entity.

24. The apparatus of claim 23, wherein the uplink data buffer size is a reduced buffer size relative to an unadjusted buffer size at the UE, and wherein the reduced buffer size adjusts an uplink duty cycle of the UE by throttling an amount of uplink grants received from the access network entity.

25. The apparatus of claim 24, wherein the identifying the uplink data buffer size adjusts an amount of relatively low priority data that is reported to allow data traffic to be transmitted at higher power, with less fragmentation, with a higher success rate, with fewer retransmissions relative to the unadjusted buffer size, or any combinations thereof.

26. The apparatus of claim 25, wherein the instructions to identify are executable by the one or more processors to cause the apparatus to:
identify a target power or energy for the first time period; and
adjust the uplink data buffer size based at least in part on the target power or energy and the amount of available power or energy for the first time period, and wherein a reduced uplink data buffer size drives the amount of available power or energy for the first time period and the one or more second time periods towards the target power or energy.

27. The apparatus of claim 23, wherein the amount of available power or energy for uplink transmissions that can be used in the first time period is determined based at least in part on available energy for the first time period, a reserve energy level, an amount of energy previously used in the exposure threshold compliance window that becomes available for the one or more second time periods, a target power for uplink transmissions from the UE, a prior target power determined prior to the first time period, or any combinations thereof.

28. The apparatus of claim 27, wherein the amount of available power or energy that can be used in the first time period is determined to be zero when an energy associated with the target power exceeds a sum of the available energy for the first time period, the reserve energy level, and the amount of energy that becomes available for the one or more second time periods.

29. An apparatus for wireless communications at a user equipment (UE), comprising:
means for determining, based at least in part on a maximum permissible exposure (MPE) or a specific absorption rate (SAR) associated with a first time period and one or more second power levels of one or more second time periods in an exposure threshold compliance window, an amount of available power or energy for uplink transmissions from the UE during the first time period;
means for identifying, based at least in part on the amount of available power or energy for uplink transmissions, an uplink data buffer size for a buffer status report, wherein an amount of data indicated by the uplink data buffer size is in accordance with the MPE or SAR, and wherein the uplink data buffer size is different for different amounts of available power or energy for uplink transmissions from the UE during the first time period; and
means for transmitting the buffer status report to a base station.

30. A non-transitory computer-readable medium storing code for wireless communications at a user equipment (UE), the code comprising instructions executable by one or more processors to:
- determine, based at least in part on a maximum permissible exposure (MPE) or a specific absorption rate (SAR) associated with a first time period and one or more second power levels of one or more second time periods in an exposure threshold compliance window, an amount of available power or energy for uplink transmissions from the UE during the first time period;
- identify, based at least in part on the amount of available power or energy for uplink transmissions, an uplink data buffer size for a buffer status report, wherein an amount of data indicated by the uplink data buffer size is in accordance with the MPE or SAR, and wherein the uplink data buffer size is different for different amounts of available power or energy for uplink transmissions from the UE during the first time period; and
- transmit the buffer status report to a base station.

* * * * *